United States Patent
Yokoi et al.

(10) Patent No.: US 9,998,218 B2
(45) Date of Patent: Jun. 12, 2018

(54) APPARATUS AND METHOD FOR TRANSMITTING AND RECEIVING VISIBLE LIGHT DATA

(71) Applicant: SAMSUNG ELECTRONICS CO., LTD., Suwon-si (KR)

(72) Inventors: Atsuya Yokoi, Yokohama (JP); Hiroki Mizuno, Yokohama (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 289 days.

(21) Appl. No.: 14/886,823

(22) Filed: Oct. 19, 2015

(65) Prior Publication Data

US 2016/0112125 A1    Apr. 21, 2016

(30) Foreign Application Priority Data

Oct. 17, 2014  (JP) ................................ 2014-212531
Sep. 16, 2015  (KR) ........................ 10-2015-0131050

(51) Int. Cl.
*H04B 10/00*   (2013.01)
*H04B 10/116*   (2013.01)

(52) U.S. Cl.
CPC .................................. *H04B 10/116* (2013.01)

(58) Field of Classification Search
CPC . H04B 10/116; H04B 10/114; H04B 10/1143; H04B 10/1149; H04B 10/112; H04B 10/1123
USPC ....... 398/172, 118, 119, 128, 130, 158, 159, 398/183, 187, 188, 202, 208, 209
See application file for complete search history.

(56) References Cited

U.S. PATENT DOCUMENTS

| | | | | |
|---|---|---|---|---|
| 5,369,261 | A | * | 11/1994 | Shamir ............ G06K 19/06037 235/468 |
| 9,020,338 | B2 | * | 4/2015 | Walewski ............ H04B 10/114 398/158 |
| 2013/0308955 | A1 | | 11/2001 | Walewski |
| 2009/0052902 | A1 | | 2/2009 | Shinokura |
| 2010/0034540 | A1 | | 2/2010 | Togashi |

(Continued)

FOREIGN PATENT DOCUMENTS

EP    2555138 A1    2/2013
JP   2008-252570 A   10/2008

(Continued)

OTHER PUBLICATIONS

Communication dated Dec. 29, 2015, issued by the International Searching Authority in counterpart International Application No. PCT/KR2015/010979.

(Continued)

*Primary Examiner* — Hanh Phan
(74) *Attorney, Agent, or Firm* — Sughrue Mion, PLLC

(57) ABSTRACT

An apparatus for receiving visible light data, including an image acquirer configured to acquire an image including a color code, the color code including a data region and a reference region; a detector configured to detect in the acquired image an object having a shape corresponding to the color code, determine a reference candidate region in the object, and determine the object to be the color code by comparing property information of the reference region with the determined reference candidate region; and a demodulator configured to demodulate visible light data from the data region.

21 Claims, 21 Drawing Sheets

(56) References Cited

U.S. PATENT DOCUMENTS

| | | |
|---|---|---|
| 2013/0251374 A1 | 9/2013 | Chen et al. |
| 2013/0279919 A1 | 10/2013 | Yokoi |
| 2016/0055404 A1 | 2/2016 | Azuma et al. |
| 2017/0132809 A1* | 5/2017 | Hiroki .................. G06T 7/0085 |

FOREIGN PATENT DOCUMENTS

| | | |
|---|---|---|
| JP | 4361911 B2 | 11/2009 |
| JP | 2012147311 A | 8/2012 |
| JP | 2014-116706 A | 6/2014 |

OTHER PUBLICATIONS

Communication dated Sep. 19, 2017, issued by the European Patent Office in European app. No. 15851036.2.

* cited by examiner

FIG. 3
(RELATED ART)
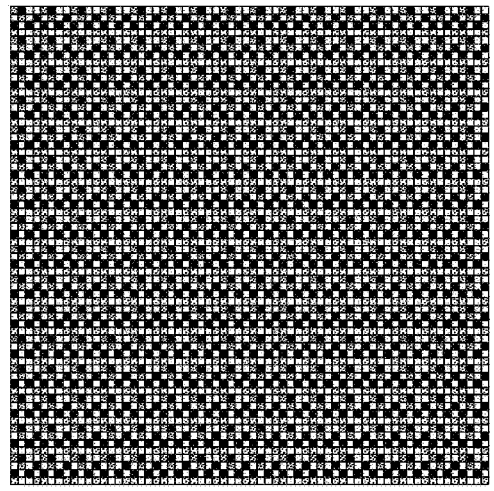
64 x 64SDM-16CSK
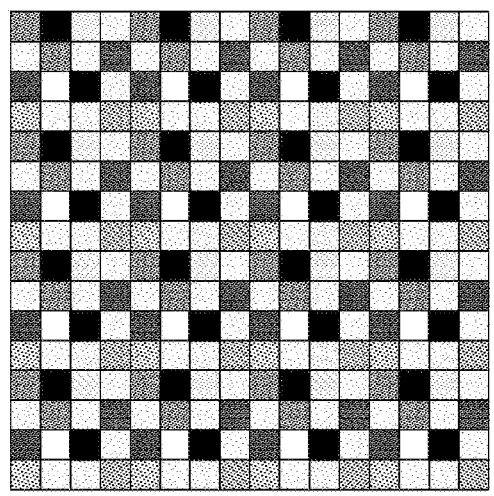
16 x 16SDM-4CSK
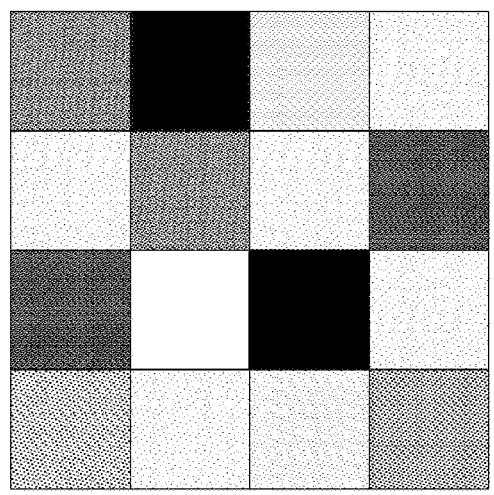
4 x 4SDM-4CSK

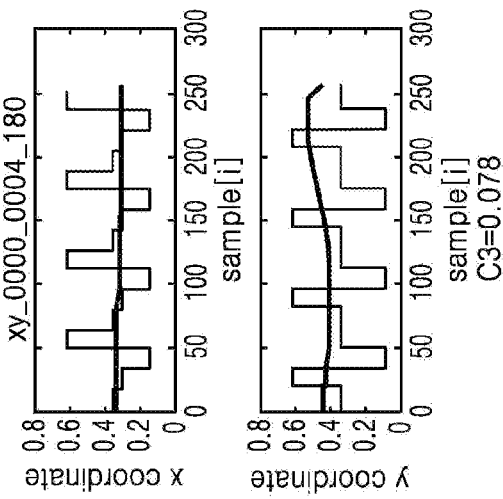
FIG. 10A — WHEN DETECTED OBJECT IS 2D CODE REGION
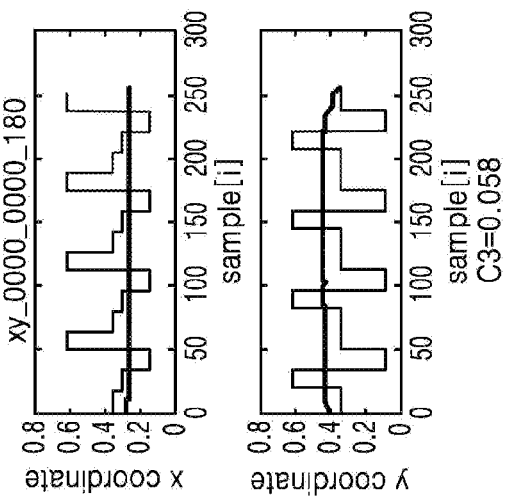
FIG. 10B — WHEN DETECTED OBJECT IS NOT 2D CODE REGION
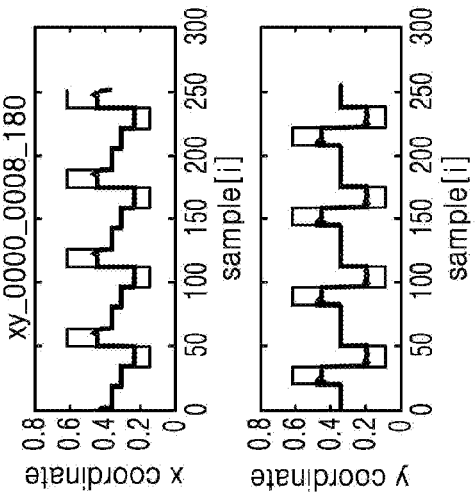
FIG. 10C — WHEN DETECTED OBJECT IS NOT 2D CODE REGION

FIG. 12

| NUMBER OF SIGNAL POINTS | NUMBER OF CELLS | | |
|---|---|---|---|
| | 8 x 8 | 16 x 16 | 32 x 32 |
| 4CSK | 2 | 4 | 8 |
| 8CSK | 1 | 2 | 4 |
| 16CSK | - | 1 | 2 |

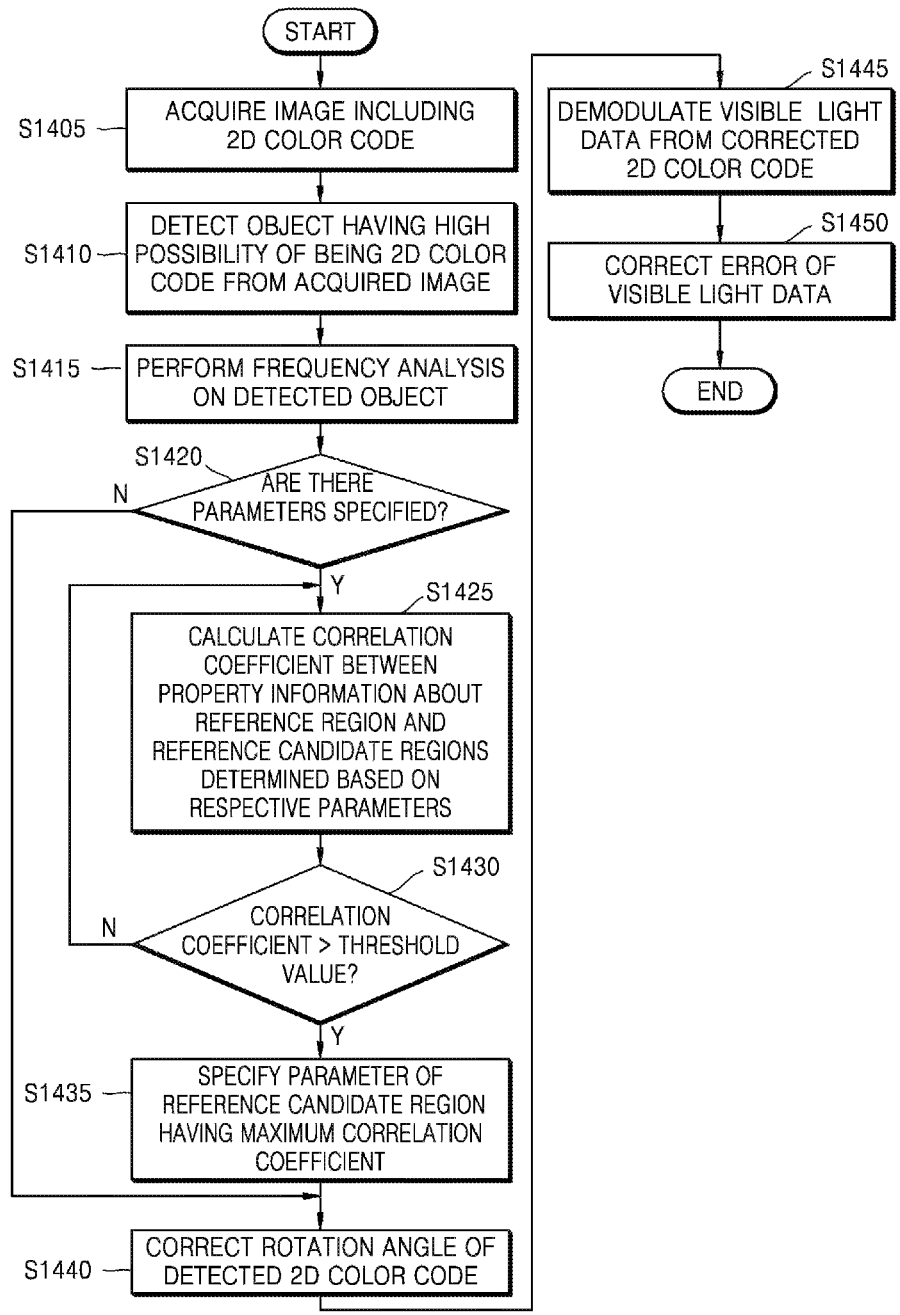

APPARATUS AND METHOD FOR TRANSMITTING AND RECEIVING VISIBLE LIGHT DATA

CROSS-REFERENCE TO RELATED APPLICATIONS

This application claims benefit from Japanese Patent Application No. 2014-212531, filed on Oct. 17, 2014, in the Japanese Patent Office and Korean Patent Application No. 10-2015-0131050, filed on Sep. 16, 2015, in the Korean Intellectual Property Office, the disclosures of which are incorporated herein in their entireties by reference.

BACKGROUND

1. Field

The present disclosure relates to methods and apparatuses for transmitting and receiving visible light data and computer-readable recording mediums storing programs for implementing the methods for transmitting and receiving visible light data.

2. Description of the Related Art

A visible light data communication system is a system that transmits/receives data by using a visible light as a carrier wave. The visible light data communication system may include a system emitting light by using a monochromatic light source such as a white light-emitting diode (LED), or a system emitting a white light by using a combination of light sources such as red (R), green (G), and blue (B) tricolor LEDs.

A system emitting light by using a combination of RGB LEDs may perform higher-speed information transmission than a system emitting light by using a white LED. Because the RGB LEDs have a higher response speed in optical modulation than the white LED and each of the RGB LEDs may be modulated into different types of information, the system emitting light by using a combination of RGB LEDs may perform higher-speed information transmission than the system emitting light by using a white LED. A scheme for transmitting different types of information by using different colors of light sources will be referred to herein as a color multiplexing scheme or a wavelength multiplexing scheme.

Japanese Laid-open Patent Publication No. 2008-252570 (hereinafter referred to as Patent Document 1) discloses a chromaticity coordinate encoding scheme (or a color shift keying (CSK) scheme) as an application of the color multiplexing scheme. CSK is a scheme for freely setting signal points on chromaticity coordinates and allocating a random bit stream to each signal point to transmit information according to an emitted light color. The CSK may freely set an emitted light color or a transmission rate and has the advantage of being robust against the influence of noise or attenuation on a light propagation path in comparison with a general color multiplexing scheme.

FIG. 1 is a diagram illustrating a CSK-based visible light communication method.

Referring to FIG. 1, four signal points are set on chromaticity coordinates, and a 2-bit input signal 00, 01, 10, or 11 is set to each signal point.

A transmitting apparatus converts visible light data into any one of the set signal points on a 2-bit basis. That is, the transmitting apparatus may represent 2-bit data by using a signal point coordinate (x, y) on the chromaticity coordinates. A scheme for representing 2-bit data by using a signal point coordinate on the chromaticity coordinates may be compared to a quadrature phase shift keying (QPSK) scheme for allocating one symbol to a 2-bit input.

The transmitting apparatus converts the signal point coordinate (x, y) into a value (R, G, B) representing the emission intensity of tricolor LEDs. For example, the relationship between a signal point coordinate $(x_i, y_i)$ and an emission intensity (R, G, B) is defined by Equation 1 below.

$$xi = R \cdot x_R + G \cdot x_G + B \cdot x_B$$

$$yi = R \cdot y_R + G \cdot y_G + B \cdot y_B$$

$$R + G + B = 1 \qquad \text{Equation 1}$$

In Equation 1, three points of $(x_R, y_R)$, $(x_G, y_G)$, and $(x_B, y_B)$ represent the positions of the emitted light colors of RGB tricolor LED light sources on the chromaticity coordinates. When the tricolor LED light sources emit lights simultaneously at the emission intensity (R, G, B) determined by Equation 1, a signal light of a color corresponding to the signal point coordinate $(x_i, y_i)$ is generated.

A receiving apparatus may acquire an intensity (R, G, B) of a received light by using a photodiode (PD) having a photosensitivity corresponding to the three RGB colors of the signal light. A received signal point is obtained by inverse-converting the acquired intensity (R, G, B) of the received light into a coordinate point (x, y) according to Equation 1. The receiving apparatus demodulates the visible light data by inverse-converting the received signal point (x, y) into a bit stream pre-allocated to the received signal point.

FIG. 2 is a diagram illustrating a CSK scheme for mapping data to any one of four signal points on chromaticity coordinates.

Herein, as in an example of FIG. 2, a CSK scheme for mapping data to any one of four signal points on the chromaticity coordinates (referred to as symbol mapping) will be referred to as a 4CSK scheme. The number of signal points may be randomly set as 8CSK and 16CSK as illustrated in FIG. 3. Information may be transmitted at up to 3 bits/symbol in the 8CSK, and information may be transmitted at up to 4 bits/symbol in the 16CSK. As the number of signal points on the chromaticity coordinates increases, because the amount of information that may be transmitted by 1 symbol increases, a transmission rate thereof may be improved. Also, for example, the CSK has the various advantages of securing the communication connectivity in the chromaticity coordinates and suppressing a flicker caused by a brightness variation because the total emission intensity thereof is uniform.

Japanese Laid-open Patent Publication No. 2014-116706 (hereinafter referred to as Patent Document 2) discloses a system in which a transmitting apparatus such as a display apparatus transmits CSK communication color information (CSK code) to a receiving apparatus such as a camera. Also, Patent Document 2 employs a two-dimensional (2D) color code in which a plurality of color information is disposed two-dimensionally in a CSK code. In this manner, a CSK scheme improving a transmission rate per frame (image) by space division multiplexing (SDM) will be referred to herein as an SDM-CSK scheme. In Patent Document 2, the display apparatus displays SDM-CSK codes continuously at a predetermined frame rate, and the camera captures a moving image of the displayed SDM-CSK codes, thereby obtaining a predetermined transmission rate.

FIG. 3 is a diagram illustrating examples of SDM-CSK codes that are 2D color codes.

Because the codes illustrated in FIG. 3 are different in terms of the number of cells and the number of signal points (the number of reference colors), the illustrated codes are different in terms of an information transmission rate. For example, when a display frame rate is 15 fps, a transmission rate of 480 bps may be obtained in an SDM-CSK code 4×4SDM-4CSK in which the number of cells corresponds to 4×4 and the number of signal points is 4, and a transmission rate of 240 kbps may be obtained in an SDM-CSK code 64×64SDM-16CSK in which the number of cells corresponds to 64×64 and the number of signal points is 16.

However, when communication is performed between a display and a camera as in Patent Document 2, an error may occur in the received chromaticity coordinates due to the influence of an interference light or the color property of the display or the camera. That is, the chromaticity coordinates intended by the transmitting apparatus may be different from the chromaticity coordinates recognized by the receiving apparatus.

Patent Document 2 discloses a method of correcting colors by using a reference cell having a known color arrangement. In detail, a reference cell, in which reference colors are arranged in a predetermined order, may be disposed at a plurality of positions in an SDM-CSK code. For example, the reference color arrangement is information indicating which reference colors are disposed repeatedly at what times and in what order. Also, the reference colors correspond to the colors of four signal points on the chromaticity coordinates.

Patent Document 2 demodulates a data region of the SDM-CSK code on the basis of the chromaticity coordinates recognized from the reference cell. Also, when the chromaticity coordinates recognized from the top and bottom reference cells are different from each other, Patent Document 2 performs linear interpolation therebetween to generate the reference colors and demodulate the data region. By generating the reference colors according to the linear interpolation, Patent Document 2 corrects an error that may be caused by the interference light or the color property of the display or the camera.

Japanese Patent Publication No. 4337879 (hereinafter referred to as Patent Document 3) also indicates that an error may occur in the received data due to the color property difference of the display or the camera when information is transmitted by multicolored 2D barcodes (not CSK codes). Patent Document 3 discloses a method of solving the problem of an error occurring in the received data by generating, by the transmitting apparatus, a reference point representing a color tone or a comparison point representing the number of color tones used in the barcode at some point of the multicolored 2D barcode and correcting, by the receiving apparatus, the color tone of a captured image with reference to the color tone represented by the reference point.

In the communication between the display and the camera described in Patent Documents 2 and 3, a 2D color code such as an SDM-CSK code should be identified in an image captured by the camera that is the receiving apparatus. However, the receiving apparatus may misrecognize another object having a similar shape to a 2D color code included in the image as a 2D color code.

Also, when a 2D color code detected from the image is photographed without being disposed in a preset direction, the receiving apparatus may not accurately demodulate data from the 2D color code.

In the conventional communication between the display and the camera, when the transmitting apparatus changes a parameter such as the number of cells of the 2D color code or the number of signal points used in visible light communication, the receiving apparatus may not demodulate the 2D color code. A method of notifying the receiving apparatus of the parameter independently from the 2D color code has been designed in order to analyze the changed parameter. However, the method of notifying the receiving apparatus of the parameter requires additional hardware or processes.

SUMMARY

Provided are visible data communication systems that may prevent the misdetection of a two-dimensional (2D) color code and detect a rotation angle of the 2D color code to correct the detected 2D color code.

Provided are visible data communication systems that may analyze a changed parameter even without notifying a parameter of a 2D color code to a receiving apparatus.

Additional aspects will be set forth in part in the description which follows and, in part, will be apparent from the description, or may be learned by practice of the presented exemplary embodiments.

According to an aspect of an exemplary embodiment, an apparatus for receiving visible light data includes an image acquirer configured to acquire an image including a color code, the color code including a data region and a reference region; a detector configured to detect in the acquired image an object having a shape corresponding to the color code, determine a reference candidate region in the object, and determine the object to be the color code by comparing property information of the reference region with the determined reference candidate region; and a demodulator configured to demodulate visible light data from the data region.

The detector may be further configured to determine the object to be the color code when a correlation coefficient between chromaticity coordinates of reference candidate cells included in the determined reference candidate region and chromaticity coordinates of reference cells included in the property information is greater than a threshold value.

The detector may be further configured to predict a rotation angle of the detected color code by using the correlation coefficient between the chromaticity coordinates of the reference candidate cells and the chromaticity coordinates of the reference cells, and to correct the detected color code according to the predicted rotation angle.

The detector may be further configured to determine the object to be the color code when a distance between chromaticity coordinates of reference candidate cells included in the determined reference candidate region and a chromaticity coordinates of reference cells included in the property information is smaller than a threshold distance.

The detector may be further configured to predict a rotation angle of the detected color code by using the distance between the chromaticity coordinates of the reference candidate cells and the chromaticity coordinates of the reference cells, and to correct the detected color code according to the predicted rotation angle.

The detector may be further configured to determine the object to be the color code by comparing a frequency spectrum corresponding to a chromaticity of reference candidate cells included in the determined reference candidate region and a frequency spectrum corresponding to a chromaticity of reference cells included in the property information.

The detector may be further configured to measure a peak value of a frequency spectrum represented by a color of reference candidate cells included in the determined reference candidate region and to determine a pattern of the reference candidate cells based on the measured peak value.

The pattern of the reference candidate cells includes at least one parameter relating to at least one of a number of signal points representing the visible light data, a number of cells included in the data region, and a pattern of a reference point repeated in the reference region.

According to another aspect of an exemplary embodiment, an apparatus for transmitting visible light data includes an acquirer configured to acquire a data region including data cells and to generate a color code by arranging a reference region including reference cells at a preset position with respect to the data region; and a display configured to display an image including the generated color code, wherein at least one object having a shape corresponding to the color code is identified by property information of the reference region.

The property information of the reference region may include at least one of a chromaticity coordinate of the reference cells included in the reference region and a frequency spectrum corresponding to a chromaticity of the reference cells.

According to yet another aspect of an exemplary embodiment, a method for receiving visible light data includes acquiring an image including a color code, the color code including a data region and a reference region; detecting in the acquired image an object having a shape corresponding to the color code; determining a reference candidate region in the object; determining the object to be the color code by comparing property information of the reference region with the determined reference candidate region; and demodulating visible light data from the data region.

Determining the object to be the color code may further include determining the object to be the color code when a correlation coefficient between chromaticity coordinates of reference candidate cells included in the determined reference candidate region and chromaticity coordinates of reference cells included in the property information is greater than a threshold value.

The method may further include predicting a rotation angle of the detected color code by using the correlation coefficient between the chromaticity coordinates of the reference candidate cells and the chromaticity coordinates of the reference cells; and correcting the detected color code according to the predicted rotation angle.

Determining the object to be the color code may further include determining the object to be the color code when a distance between chromaticity coordinates of reference candidate cells included in the determined reference candidate region and chromaticity coordinates of reference cells included in the property information is smaller than a threshold distance.

The method may further include predicting a rotation angle of the detected color code by using the distance between the chromaticity coordinates of the reference candidate cells and the chromaticity coordinates of the reference cells; and correcting the detected color code according to the predicted rotation angle.

Determining the object to be the color code may further include determining the object to be the color code by comparing a frequency spectrum corresponding to a chromaticity of reference candidate cells included in the determined reference candidate region and a frequency spectrum corresponding to a chromaticity of reference cells included in the property information.

Determining the object to be the color code may further include measuring a peak value of a frequency spectrum represented by a color of reference candidate cells included in the determined reference candidate region and determining a pattern of the reference candidate cells based on the measured peak value.

The pattern of the reference candidate cells may include at least one parameter relating to at least one of a number of signal points representing the visible light data, a number of cells included in the data region, and a pattern of a reference point repeated in the reference region.

According to a further aspect of an exemplary embodiment, a method for transmitting visible light data, includes acquiring a data region including data cells; generating a color code by arranging a reference region including reference cells at a preset position with respect to the data region; and displaying an image including the acquired color code, wherein at least one object having a shape corresponding to the color code is identified by property information of the reference region.

The property information of the reference region may include at least one of a chromaticity coordinate of each of the reference cells included in the reference region and a frequency spectrum about a chromaticity of each of the reference cells.

According to another embodiment there is provided a non-transitory computer-readable recording medium that may store a program that performs the methods disclosed herein.

According to a still further aspect of an exemplary embodiment, a method of receiving data, includes acquiring an image; identifying an object included in the image by comparing a shape of the object with a predetermined shape; identifying, in the object, a first candidate reference region having a first property and a second candidate reference region having a second property; determining a comparison result by comparing the first property and the second property with a predetermined property; determining a reference region from among the first candidate reference region and the second candidate reference region based on the comparison result; identifying a data region included in the object using the reference region; and decoding data from the identified data region.

The object may be a color code, the first property may relate to first chromaticity coordinates corresponding to the first candidate reference region, the second property may relate to second chromaticity coordinates corresponding to the second candidate reference region, and the predetermined property may relate to predetermined chromaticity coordinates.

Determining the comparison result may further include determining a first correlation coefficient between the first chromaticity coordinates and the predetermined chromaticity coordinates, determining a second correlation coefficient between the second chromaticity coordinates and the predetermined chromaticity coordinates, and comparing the first correlation coefficient and the second correlation coefficient with a threshold value.

Determining the comparison result may further include determining a first distance between the first chromaticity coordinates and the predetermined chromaticity coordinates, determining a second distance between the second chromaticity coordinates and the predetermined chromaticity coordinates, and comparing the first distance and the second distance with a threshold value.

BRIEF DESCRIPTION OF THE DRAWINGS

These and/or other aspects will become apparent and more readily appreciated from the following description of the exemplary embodiments, taken in conjunction with the accompanying drawings in which:

FIG. 3 is a diagram illustrating examples of space division multiplexing (SDM)-CSK codes that are two-dimensional (2D) color codes;

FIGS. 10A to 10F are graphs illustrating a correlation coefficient Ck calculated for each of reference candidate regions, according to an exemplary embodiment;

FIG. 12 is a table illustrating a parameter of a 2D color code, according to an exemplary embodiment;

FIG. 14 is a flowchart illustrating a method of determining a parameter by analyzing a detected 2D color code by a visible light data receiving apparatus, according to an exemplary embodiment;

DETAILED DESCRIPTION

Figure 1:
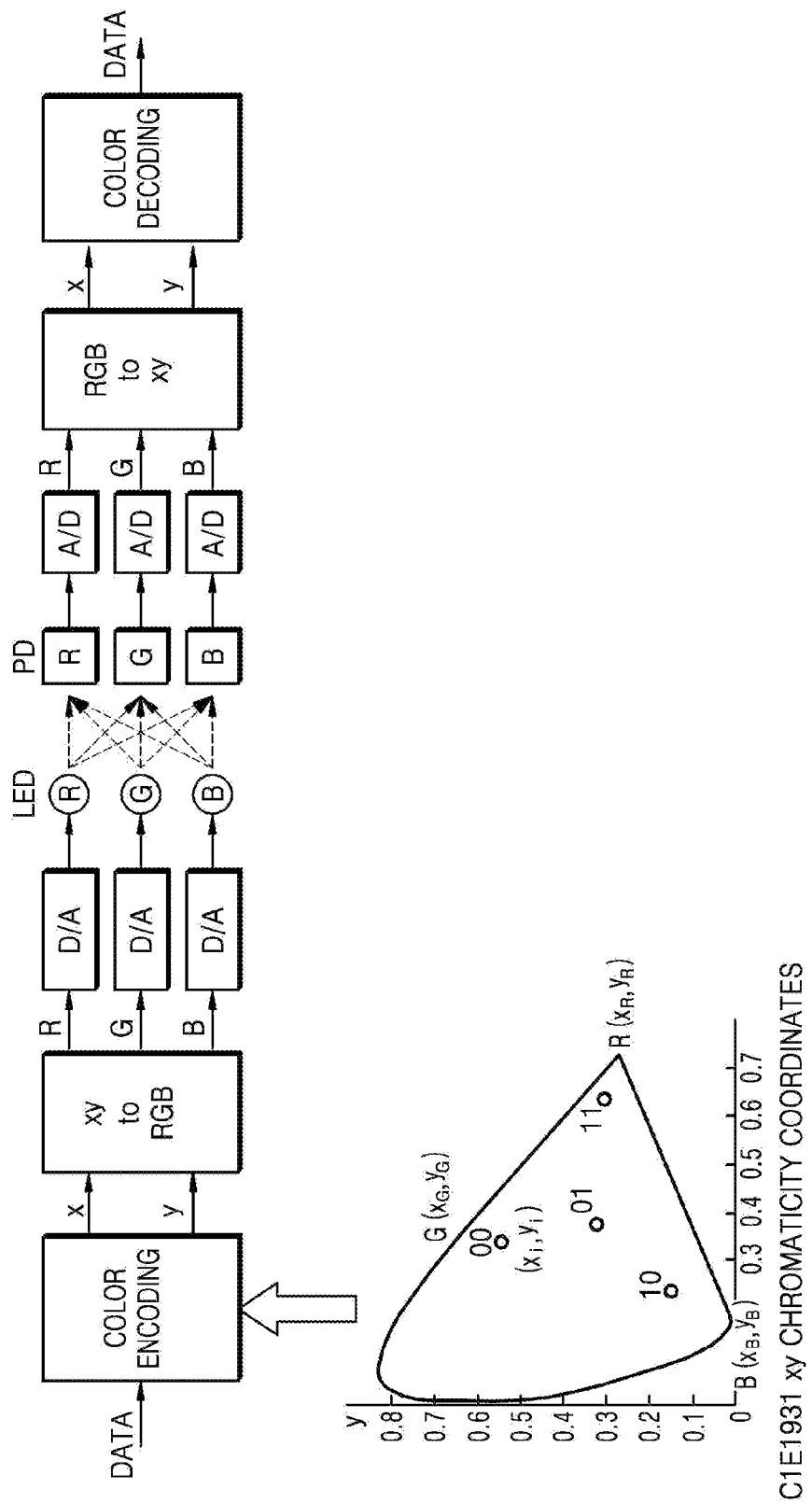
FIG. 1 is a diagram illustrating a color shift keying (CSK)-based visible light communication method.
Figure 2:
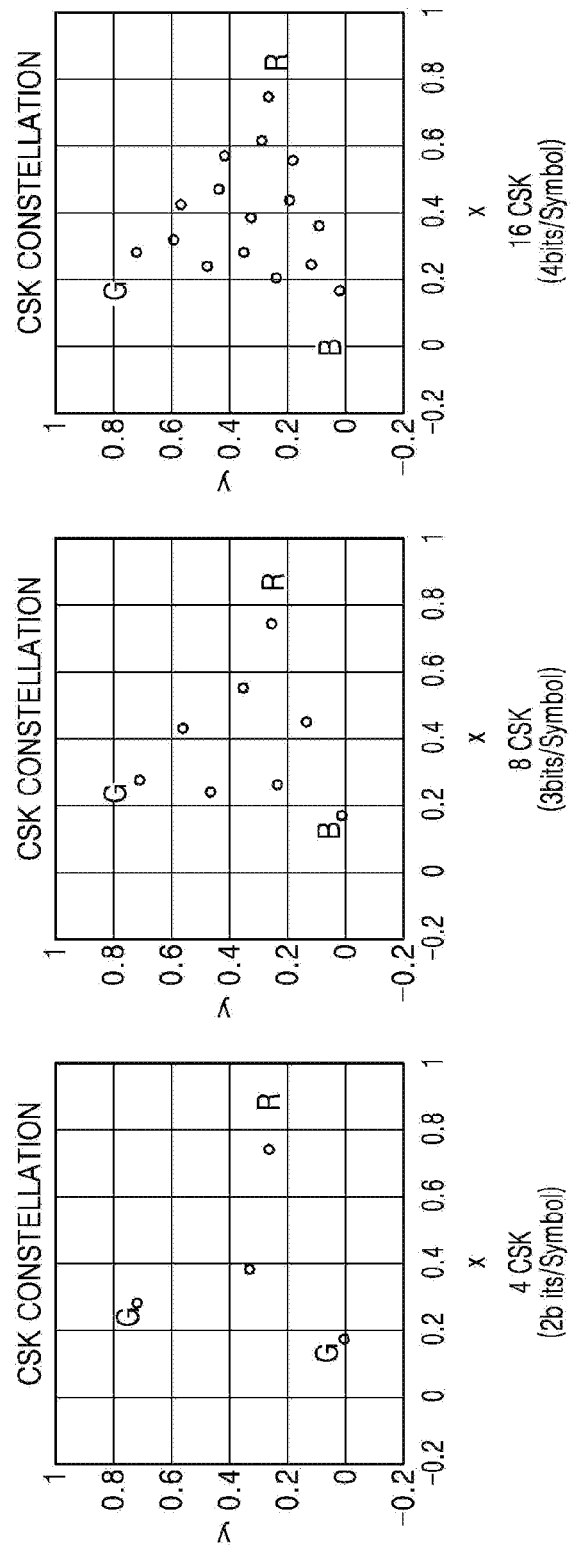
FIG. 2 is a diagram illustrating a CSK scheme for mapping data to any one of four signal points on chromaticity coordinates.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, exemplary embodiments will be described in detail with reference to the accompanying drawings so that those of ordinary skill in the art may easily implement the exemplary embodiments. However, the exemplary embodiments may have different forms and should not be construed as being limited to the descriptions set forth herein. In addition, portions irrelevant to the description of the exemplary embodiments will be omitted in the drawings for a clear description of the exemplary embodiments, and like reference numerals will denote like elements throughout the specification.

Throughout the specification, when an element is referred to as being "connected" to another element, it may be "directly connected" to the other element or may be "electrically connected" to the other element with one or more intervening elements therebetween. Also, when something is referred to as "including" a component, another component may be further included unless specified otherwise.

Exemplary embodiments will be described below in detail with reference to the accompanying drawings.

Hereinafter, exemplary embodiments will be described in detail with reference to the drawings.

Figure 4:
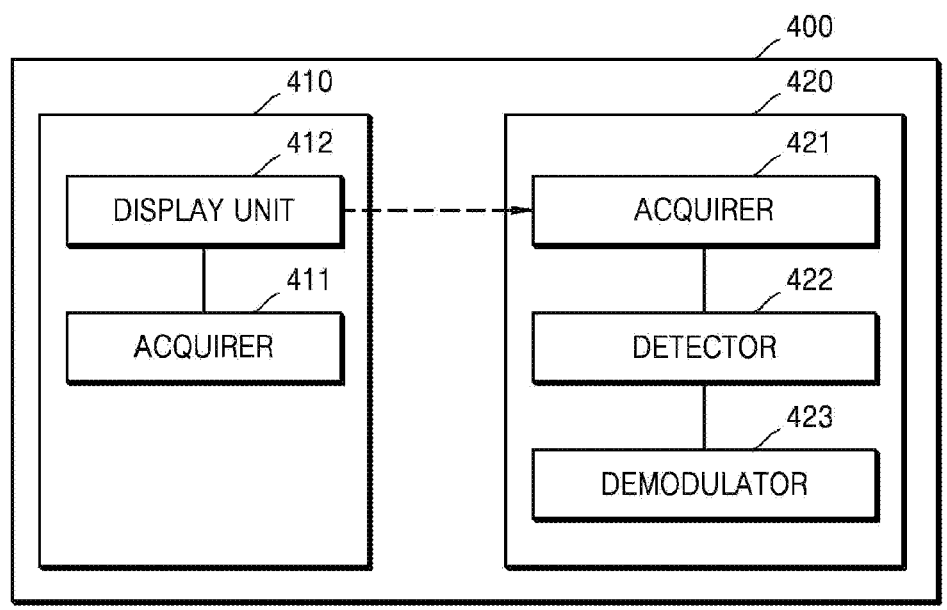
FIG. 4 is a diagram illustrating a visible light data communication system according to an exemplary embodiment.

FIG. 4 is a diagram illustrating a visible light data communication system 400 according to an exemplary embodiment.

Referring to FIG. 4, the visible light data communication system 400 according to an exemplary embodiment may include a visible light data transmitting apparatus 410 modulating visible light data into a two-dimensional (2D) color code prior to transmission and a visible light data receiving apparatus 420 demodulating the visible light data from the received 2D color code.

The visible light data transmitting apparatus 410 according to an exemplary embodiment may include an information processing apparatus including a display device, a memory device storing a control program or data, and a control device executing processes necessary to convert the visible light data into the 2D color code based on the control program. The visible light data transmitting apparatus 410 may include, but is not limited to, a smart phone, a tablet terminal, a personal computer (PC), or a digital signage apparatus.

The visible light data transmitting apparatus 410 according to an exemplary embodiment may include an acquirer 411 and a display 412.

The acquirer 411 may generate a color code. For example, the acquirer 411 may generate a 2D color code. The 2D color code may include a plurality of cells. A portion of the cells included in the 2D color code may be a reference region, and another portion thereof may be a data region. Also, the reference region may be disposed at a preset position with respect to the data region.

Figure 5:
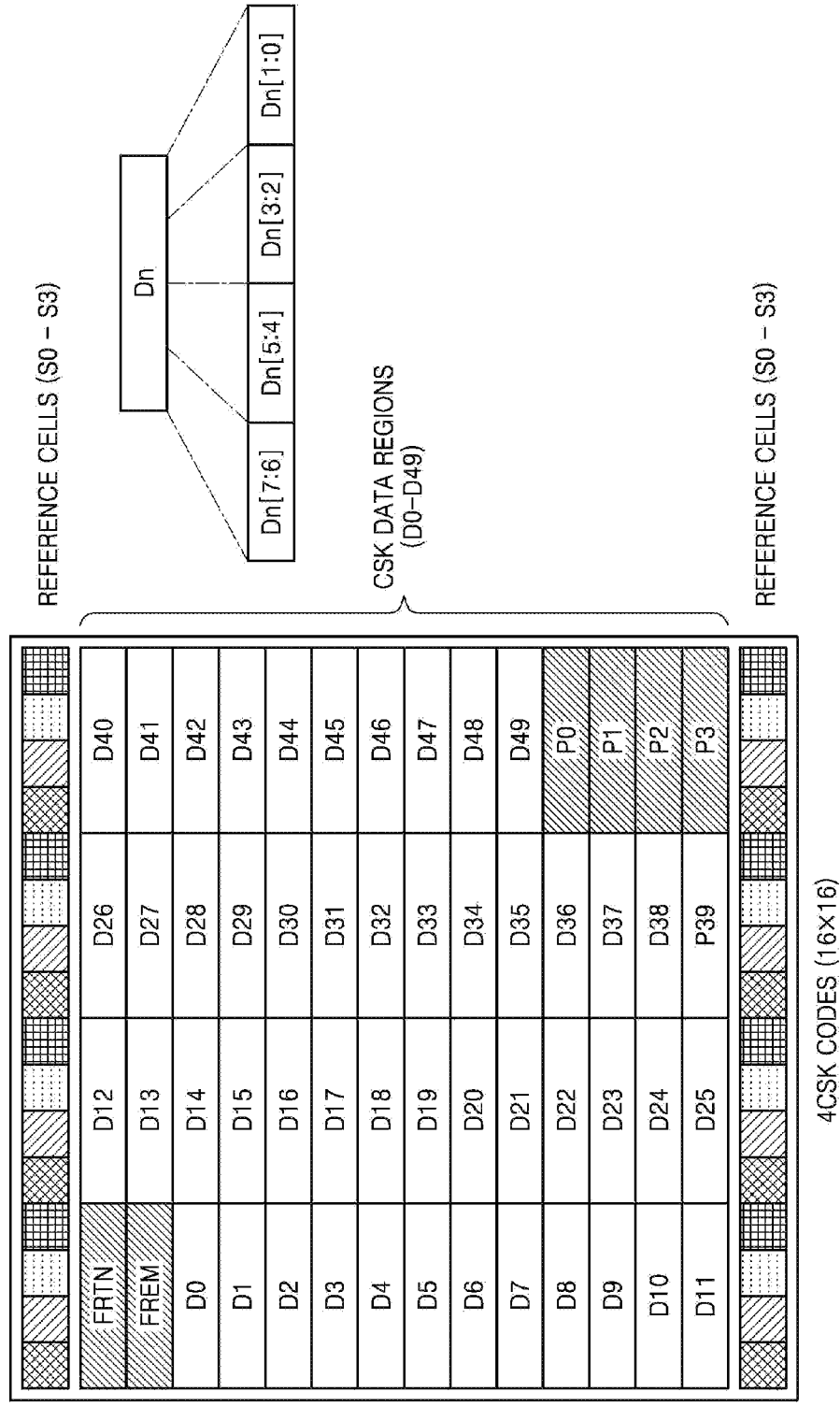
FIG. 5 is a diagram illustrating an example of a 16×16SDM-4CSK code in which a reference cell is disposed.

Hereinafter, the 2D color code will be described in detail with reference to FIG. 5 illustrating an example of a 16×16 space division multiplexing (SDM)-4 color shift keying (CSK) code in which a reference cell is disposed.

FIG. 5 is a diagram illustrating an example of a 16×16SDM-4CSK code in which a reference cell is disposed.

In an exemplary embodiment according to FIG. 5, reference cells are disposed at the top and bottom of an SDM-CSK code. Each of the reference cells has a structure in which a reference color arrangement of four colors is repeated four times.

Referring to FIG. 5, a square 2D color code has a structure in which square cells are disposed in a matrix configuration. Herein, the square cells have a structure of 16 cells×16 cells. In the square 2D color code, a reference region may be disposed at the top and bottom of a data region that is a preset position. For example, in the square cells, a first row and a sixteenth row may be a reference region. Also, second to fifteenth rows may be a data region. Hereinafter, cells constituting the reference region will be referred to as reference cells, and cells constituting the data region will be referred to as data cells.

In the reference region, a plurality of reference cells each having a reference color corresponding to any one of a plurality of reference points defined on chromaticity coordinates may be arranged in a preset order. For example, four types of reference cells S0, S1, S2, and S3 may be arranged repeatedly four times in the reference region of the 2D color code, as illustrated in FIG. 5. A reference color of the reference cells S0 to S3 may be set to be identical to a reference color of four signal points set on the chromaticity coordinates. However, this is merely exemplary, and the reference color may be randomly set on the chromaticity coordinates.

In the data region, the visible light data may be modulated and stored according to the CSK code. Because a method of modulating the visible light data according to the CSK code is well-known in the art, detailed descriptions thereof will be omitted herein. The 2D color code of FIG. 5 uses a 4CSK code, and each data cell has a reference color of a signal point that is any one of four signal points defined on the chromaticity coordinates. The reference color of a signal point included in each data cell may represent 2-bit information. In the example of FIG. 5, 1-byte data may be transmitted by using one frame including four data cells.

The 2D color code includes control frames FRTN, FREM, and P0 to P3 in addition to data frames D0 to D49 obtained by modulating the visible light data. FRTN represents the number of data frames, and FREM represents the number of remaining frames except the data frames in all the frames. P0 to P3 represent an error correction code.

Referring to the 2D color code of FIG. 5, each of 50 data frames may represent 8-bit data. Also, when the 2D color code of FIG. 5 is displayed at a frame rate of 15 Hz, the visible light data may be transmitted at a transmission rate of 6 kbps.

Referring to FIG. 4, the display 412 may display a 2D color code generated by the acquirer 411 as a recognizable image. For example, the display 412 may include a display or a projector. When the acquirer 411 outputs a 2D color code at a predetermined frame rate, the display 412 may display the 2D color code according to the frame rate output from the acquirer 411.

When the display 412 displays the 2D color code according to the frame rate of the acquirer 411, the total emission intensity of the 2D color code may be maintained uniformly according to the property of the CSK code. Because the total emission intensity of the 2D color code is maintained uniformly, the display 412 may display the 2D color code as a moving image without a flicker caused by a brightness variation.

The visible light data receiving apparatus 420 may include an information processing apparatus including an image input device, a memory device storing a control program or various data, and a control device executing processes necessary to demodulate the visible light data based on the control program. The visible light data receiving apparatus 420 may include, but is not limited to, a smart phone, a tablet terminal, and a PC.

The visible light data receiving apparatus 420 according to an exemplary embodiment may include an image acquirer 421, a detector 422, and a demodulator 423.

The image acquirer 421 may perform a process for acquiring an image including the 2D color code. For example, the image acquirer 421 may include a camera. When the visible light data transmitting apparatus 410 transmits the 2D color code in the form of a moving image, the image acquirer 421 may capture a moving image at a frame rate that is higher than or equal to a frame rate at which a moving image is transmitted. The image acquirer 421 may output each image frame constituting the captured moving image.

The detector 422 may detect the 2D color code from a frame-based image output from the image acquirer 421. For example, the detector 422 may identify the 2D color code from the image by using the feature of a 2D color code shape.

When the detector 422 identifies the 2D color code from the image by using only the feature of a 2D color code shape, the detector 422 may mistakenly detect an object that is not the 2D color code.

The detector 422 according to an exemplary embodiment may determine a reference candidate region in an object having a shape corresponding to the 2D color code included in the image. The detector 422 may detect the 2D color code by comparing property information about the reference region and the determined reference candidate region.

For example, the detector 422 may detect the 2D color code by calculating a correlation coefficient between the chromaticity coordinate of each of cells included in the determined reference candidate region and the chromaticity coordinate of each of reference cells included in the property information. A method of detecting the 2D color code by the detector 422 by using the correlation coefficient will be described below in greater detail with reference to FIG. 8.

As another example, the detector 422 may detect the 2D color code by calculating a distance between the chromaticity coordinate of each of the cells included in the determined reference candidate region and the chromaticity coordinate of each of the reference cells included in the property information. A method of detecting the 2D color code by the detector 422 by using the distance will be described below in greater detail with reference to FIG. 11.

As another example, the detector 422 may detect the 2D color code by comparing a frequency spectrum represented by the color of each of reference cells included in the determined reference candidate region and a frequency spectrum represented by the reference color of each of reference cells included in the property information. A method of detecting the 2D color code by the detector 422 by using the frequency spectrum will be described below in greater detail with reference to FIG. 14.

When the 2D color code detected from the image is different from a preset arrangement, the detector 422 according to an exemplary embodiment may identify the difference between the preset arrangement and the arrangement of the 2D color code. For example, referring to FIG. 4, when the reference region is not horizontally disposed at the top and bottom of the data region, the detector 422 may determine that the detected 2D color code is rotated.

In some exemplary embodiments, when determining that the detected 2D color code is rotated, the detector 422 may determine a rotation angle of the detected 2D color code. The detector 422 may correct the detected 2D color code according to the determined rotation angle.

By analyzing the frequency spectrum of the reference region included in the detected 2D color code, the detector 422 according to an exemplary embodiment may acquire information about the parameters of the 2D color code including the number of cells constituting the 2D color code, the number of signal points used to generate the data region, and the pattern of reference points constituting the reference region. When the 2D color code is changed, by analyzing the frequency spectrum, the detector 422 may acquire information about the parameters of the changed 2D color code without using a separate transmitting/receiving apparatus.

The demodulator 423 may demodulate the visible light data from the data region of the detected 2D color code. When the detected 2D color code is rotated, the demodulator 423 may demodulate the visible light data from the data region of the 2D color code corrected by the detector 422.

Figure 6:
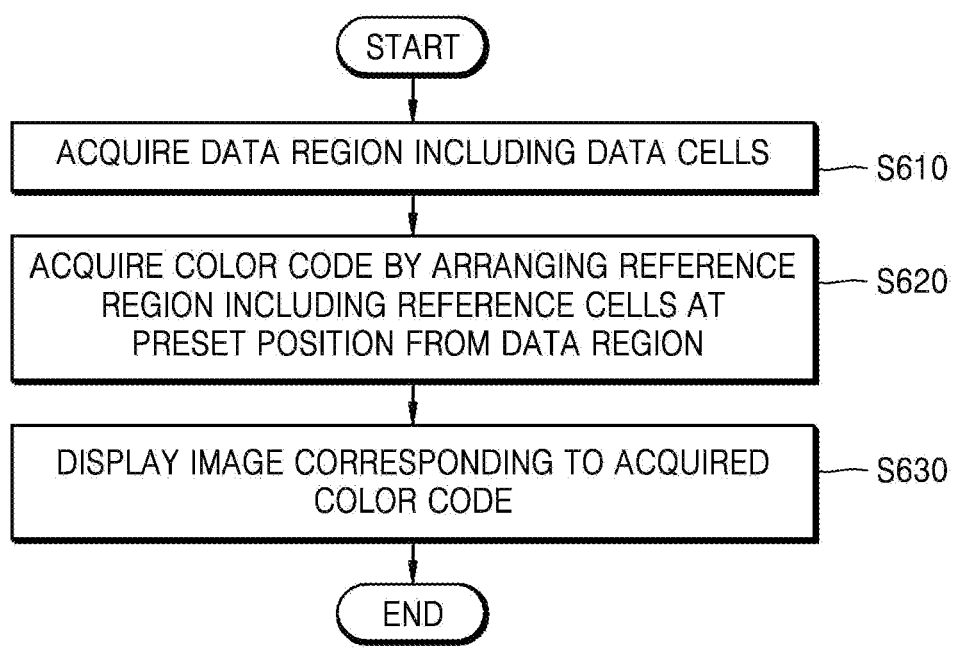
FIG. 6 is a flowchart illustrating a method for transmitting visible light data by a visible light data transmitting apparatus, according to an exemplary embodiment.
Figure 7:
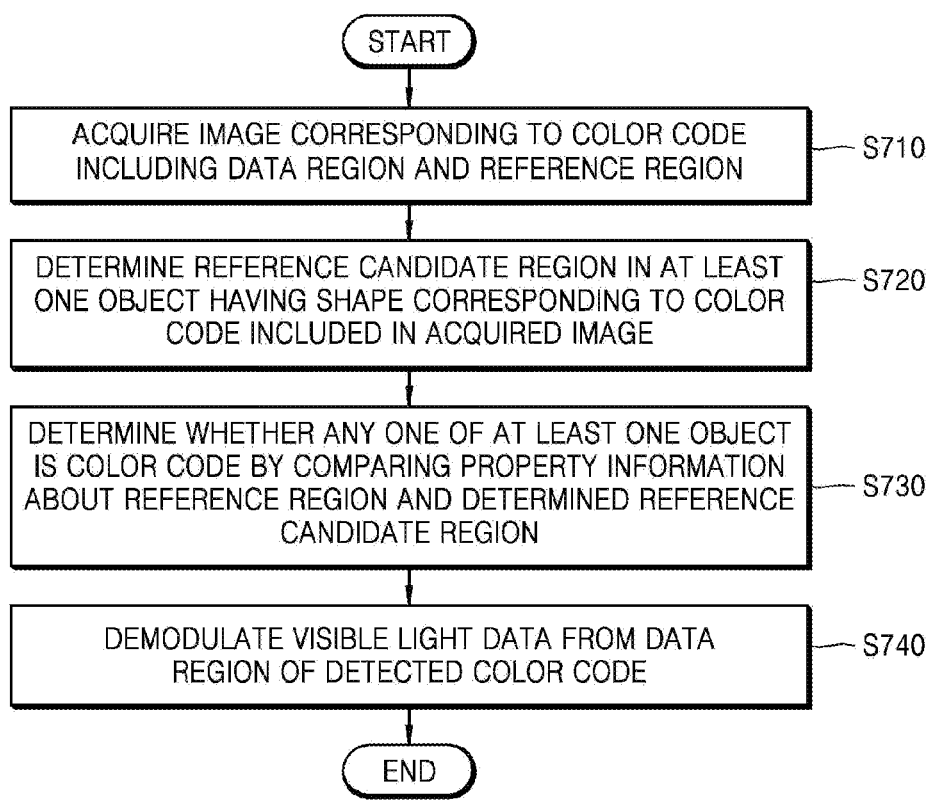
FIG. 7 is a flowchart illustrating a method of demodulating visible light data by a visible light data receiving apparatus, according to an exemplary embodiment.

Hereinafter, operations of the visible light data communication system 400 according to an exemplary embodiment will be described with reference to the flowcharts of FIGS. 6 and 7. In FIGS. 6 and 7, it is assumed that the 2D color code is 16×16SDM-4CSK.

FIG. 6 is a flowchart illustrating a method of transmitting visible light data by a visible light data transmitting apparatus according to an exemplary embodiment.

Referring to FIG. 6, in operation S610, the visible light data transmitting apparatus acquires a data region including a plurality of data cells.

The visible light data transmitting apparatus according to an exemplary embodiment may acquire a data region in which a plurality of data cells are arranged according to a preset structure. For example, as illustrated in FIG. 5, the visible light data transmitting apparatus may acquire a data region having a matrix configuration of 16 cells×14 cells. Herein, the visible light data transmitting apparatus may acquire a data cell by encoding the visible light data according to CSK. Because a method of generating the data cell according to CSK is well-known in the art, detailed descriptions thereof will be omitted herein.

In operation S620, the visible light data transmitting apparatus acquires or generates a color code by arranging a reference region including a plurality of reference cells at a preset position from the data region.

The visible light data transmitting apparatus according to an exemplary embodiment may acquire a color code by arranging a reference region including a plurality of reference cells, which each have a reference color corresponding to any one of a plurality of reference points defined on the chromaticity coordinates, at a preset position with respect to the data region.

For example, as illustrated in FIG. 5, the visible light data transmitting apparatus may generate a reference region of 16 cells×1 cell in which an arrangement of four types of reference cells S0, S1, S2, and S3 is repeated four times. The visible light data transmitting apparatus may dispose the generated reference region at each of the top and bottom of the data region. Herein, a reference color that is the color of the reference cells S0 to S3 may be identical to a standard color that is the color of four signal points set on the chromaticity coordinates. However, this is merely exemplary, and the reference color may be different from the standard color.

As illustrated in FIG. 5, the visible light data transmitting apparatus may generate a 2D color code of 16 cells×16 cells in which a reference region of 16 cells×1 cell, a data region of 16 cells×14 cells, and a reference region of 16 cells×1 cell are disposed.

In operation S630, the visible light data transmitting apparatus may display the generated color code.

FIG. 7 is a flowchart illustrating a method of demodulating visible light data by a visible light data receiving apparatus according to an exemplary embodiment.

Referring to FIG. 7, in operation S710, the visible light data receiving apparatus acquires an image corresponding to a color code including a data region and a reference region. The reference region according to an exemplary embodiment may be arranged at a preset position with respect to the data region.

In operation S720, the visible light data receiving apparatus determines a reference candidate region in at least one object having a shape corresponding to the 2D color code included in the acquired image.

In operation S730, the visible light data receiving apparatus detects or otherwise determines whether any one of the at least one objects is the color code by comparing property information about the reference region and the determined reference candidate region.

For example, the visible light data receiving apparatus may detect the 2D color code by calculating a correlation coefficient between the chromaticity coordinate of each of cells included in the determined reference candidate region and the chromaticity coordinate of each of reference cells included in the property information. As another example, the visible light data receiving apparatus may detect the 2D color code by calculating a distance between the chromaticity coordinate of each of the cells included in the determined reference candidate region and the chromaticity coordinate of each of the reference cells included in the property information. As another example, the visible light data receiving apparatus may detect the 2D color code by comparing a frequency spectrum represented by the color of each of cells included in the determined reference candidate region and a frequency spectrum represented by the reference color of each of reference cells included in the property information.

When the 2D color code detected from the image is different from a preset arrangement, the visible light data receiving apparatus according to an exemplary embodiment may identify the difference between the preset arrangement and the arrangement of the detected 2D color code. Also, the visible light data receiving apparatus may determine a rotation angle of the detected 2D color code based on the difference between the preset arrangement and the arrangement of the detected 2D color code. The visible light data receiving apparatus may correct the detected 2D color code according to the determined rotation angle.

In operation S740, the visible light data receiving apparatus may demodulate the visible light data from the data region of the detected color code. When the detected color code is rotated, the visible light data receiving apparatus may demodulate the visible light data from the data region of the corrected 2D color code.

Figure 8:
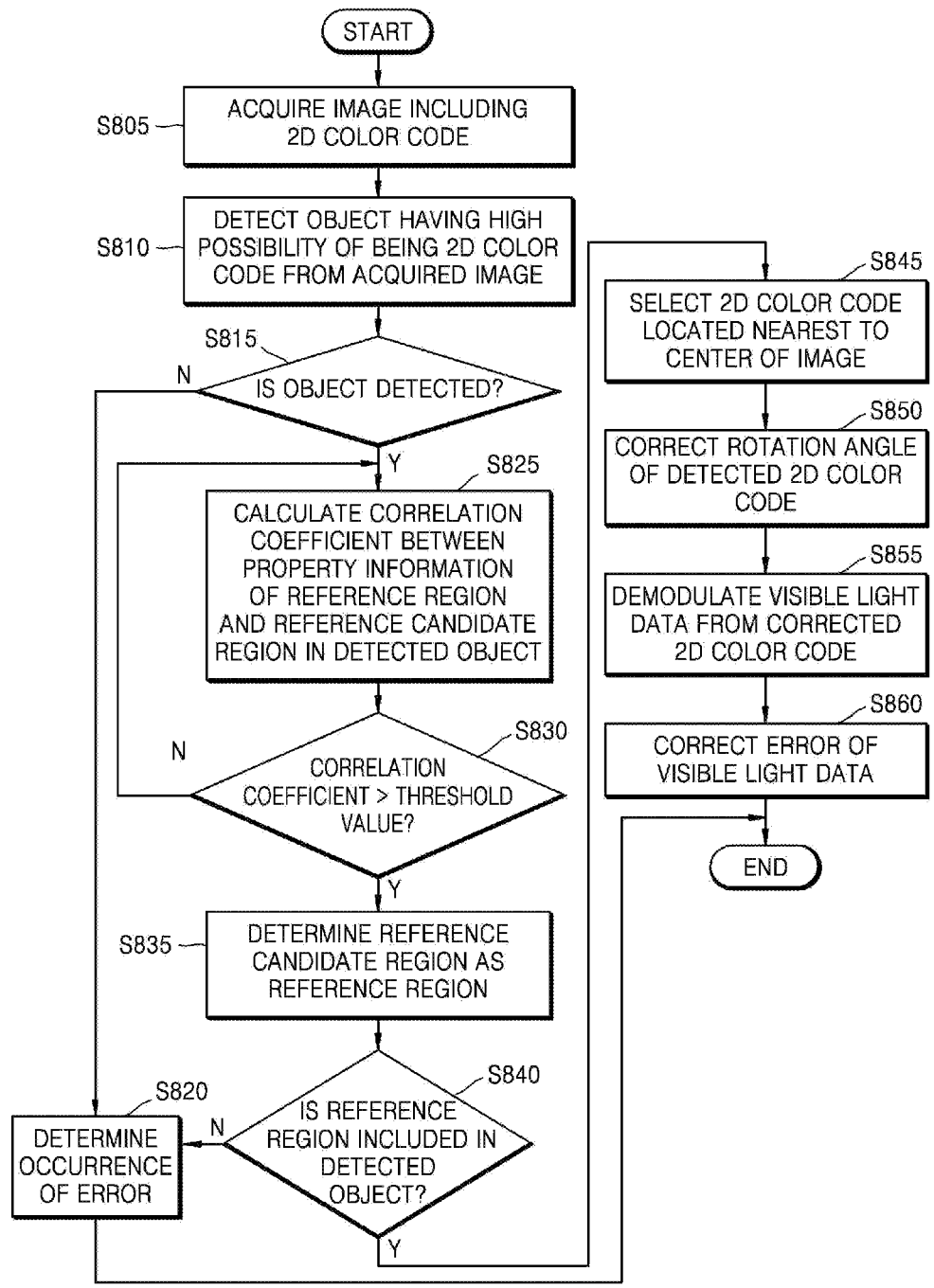
FIG. 8 is a flowchart illustrating a method of detecting a 2D color code by a visible light data receiving apparatus by using a correlation coefficient calculated by comparing property information about a reference region and a reference candidate region, according to an exemplary embodiment.

FIG. 8 is a flowchart illustrating a method for detecting a 2D color code by a visible light data receiving apparatus by using a correlation coefficient calculated by comparing property information about a reference region and a reference candidate region according to an exemplary embodiment.

Referring to FIG. 8, in operation S805, the visible light data receiving apparatus may acquire an image including a 2D color code. The visible light data receiving apparatus may acquire an image by capturing an image including the 2D color code displayed on the visible light data transmitting apparatus 410.

In operation S810, the visible light data receiving apparatus may detect an object having a high possibility of being the 2D color code from the acquired image. For example, the visible light data receiving apparatus may detect an object corresponding to the shape of the 2D color code from the acquired image based on information about the shape of the prestored 2D color code.

The example 2D color code illustrated in FIG. 5 is square. The visible light data receiving apparatus may detect at least one square object included in the image according to the shape of the 2D color code. Because a method for detecting the object of a predetermined shape from the image is well-known in the art, detailed descriptions thereof will be omitted herein.

In operation S815, the visible light data receiving apparatus may determine whether there is an object detected from the acquired image.

In operation S820, when there is no object detected, the visible light data receiving apparatus may determine that an error has occurred.

In operation S825, the visible light data receiving apparatus may calculate a correlation coefficient between property information about the reference region and the reference candidate region estimated as the reference region in the detected object.

For example, two sides among four sides of the square 2D color code illustrated in FIG. 5 correspond to the reference region. The visible light data receiving apparatus may prestore information indicating that two sides among four sides of the 2D color code correspond to the reference region. The visible light data receiving apparatus may compare each of four sides of the square detected as the reference candidate region with the property information about the reference region.

Hereinafter, a method for comparing the property information about the reference region and the reference candidate region by the visible light data receiving apparatus will be described in greater detail below with reference to FIG. 9.

Figure 9:
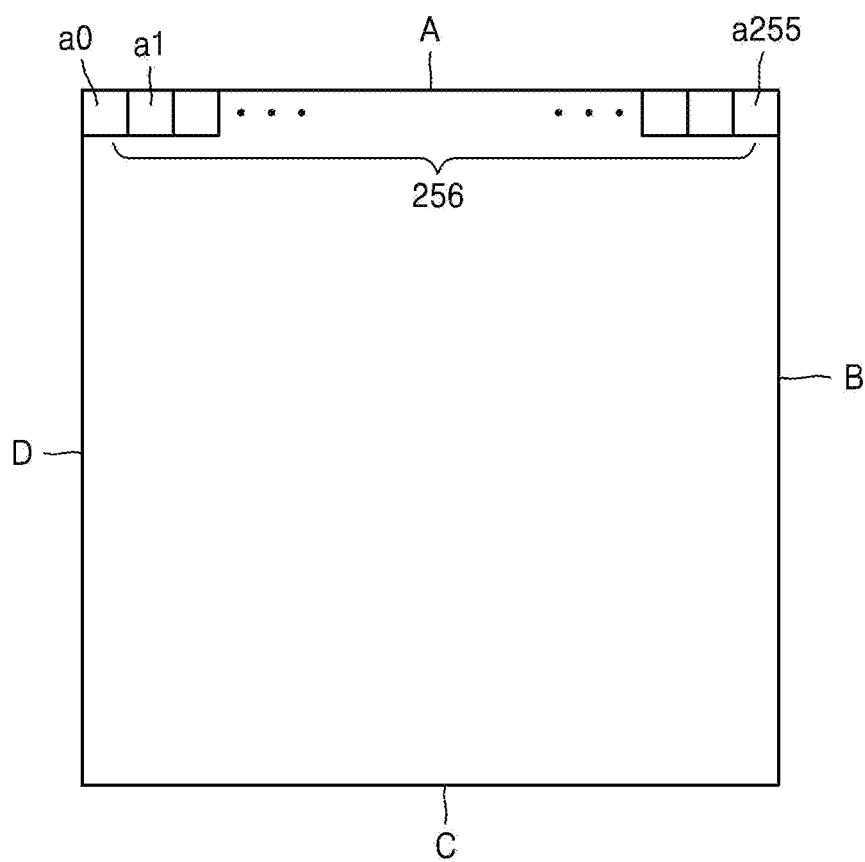
FIG. 9 is a diagram illustrating a method of determining a reference region among reference candidate regions included in a square object detected in an image by a visible light data receiving apparatus, according to an exemplary embodiment.

FIG. 9 is a diagram illustrating a method for determining a reference region among reference candidate regions included in a square object detected in an image by a visible light data receiving apparatus according to an exemplary embodiment.

Referring to FIG. 9, the visible light data receiving apparatus may determine a region, in which squares a0, a1, . . . , a255 having 1/256 of the length of a side A of a detected square as the length of one side are arranged inside the side A, as a reference candidate region. In some exemplary embodiments, the number of divisions of the side A is not limited to 256, and may be greater than the number of cells per side in a preset 2D color code.

The visible light data receiving apparatus may measure the chromaticity of the squares a0, a1, . . . , a255 having 1/256 of the length of the side A as the length of one side. Because a method for measuring the chromaticity is known in the art, detailed descriptions thereof will be omitted herein. The detector 422 may output the measured chromaticity as the values of an x-coordinate and a y-coordinate on the chromaticity coordinates. For example, the chromaticity coordinates about the chromaticity of a0, the chromaticity of a1, and the chromaticity of a255 may be output as (x0, y0), (x1, y1), and (x255, y255) respectively.

Herein, the chromaticity of the squares a0, a1, . . . , a255 having 1/256 of the length of the side A as the length of one side will be referred to as the measured chromaticity. The measured chromaticity may be different from the chromaticity (input chromaticity) of the cells of the reference region included in the 2D color code generated by the visible light data transmitting apparatus 410. For example, the measured chromaticity may be different from the input chromaticity due to the properties of the visible light data transmission path, the image acquirer 421, and the display 412.

The visible light data receiving apparatus may prestore the input chromaticity that is the chromaticity of the cells of the reference region. By determining the correlation between the input chromaticity and the measured chromaticity, the visible light data receiving apparatus may determine whether the inside of the side A corresponds to the reference region.

Equations 2 to 4 below are an example of a method for calculating the correlation coefficient in order to determine the correlation between the input chromaticity and the measured chromaticity. The visible light data receiving apparatus 420 may calculate an x-coordinate correlation coefficient Cx of each of the input chromaticity and the measured chromaticity as an index representing the correlation therebetween based on Equation 2 and calculate a y-coordinate correlation coefficient Cy thereof based on Equation 3.

Also, the visible light data receiving apparatus may calculate an average value Ck of the x-coordinate correlation coefficient and the y-coordinate correlation coefficient between the input chromaticity and the measured chromaticity based on Equation 4. Based on the average value Ck of the correlation coefficients calculated based on Equation 4, the visible light data receiving apparatus according to an exemplary embodiment may determine whether the reference candidate region corresponds to the reference region.

$$C_x = \frac{\sum_{i=1}^{n}(x_i - \bar{x})(X_i - \bar{X})}{\sqrt{\sum_{i=1}^{n}(x_i - \bar{x})^2}\sqrt{\sum_{i=1}^{n}(X_i - \bar{X})^2}}, -1 \le C_x \le 1 \quad \text{Equation 2}$$

$$C_y = \frac{\sum_{i=1}^{n}(y_i - \bar{y})(Y_i - \bar{Y})}{\sqrt{\sum_{i=1}^{n}(y_i - \bar{y})^2}\sqrt{\sum_{i=1}^{n}(Y_i - \bar{Y})^2}}, -1 \le C_y \le 1 \quad \text{Equation 3}$$

$$C_k = \frac{C_x + C_y}{2}, -1 \le C_k \le 1 \quad \text{Equation 4}$$

In Equations 2 and 3, xi and yi denote the coordinates of the measured chromaticity, and Xi and Yi denote the coordinates of the input chromaticity. Also, $\bar{x}$ denotes the average value of xi, $\bar{X}$ denotes the average value of Xi, $\bar{y}$ denotes the average value of yi, $\bar{Y}$ and denotes the average value of Yi. Herein, Ck may have a value from −1 to 1.

The method for calculating the correlation coefficient by the visible light data receiving apparatus according to an exemplary embodiment is not limited to the correlation coefficient according to Equations 2 to 4, and any index capable of representing the correlation therebetween may be used. For example, the visible light data receiving apparatus may represent the correlation therebetween by using a non-normalized index such as a value calculated based on the equations corresponding to the omission of the denominators in Equations 2 and 3.

In operation S830, the visible light data receiving apparatus may determine whether the calculated correlation coefficient is greater than a preset threshold value. By determining whether the calculated correlation coefficient is greater than the preset threshold value, the visible light data receiving apparatus may determine whether the reference candidate region corresponds to the reference region.

In operation S835, when the calculated correlation coefficient is greater than the preset threshold value, the visible light data receiving apparatus may determine the reference candidate region to be the reference region. The visible light data receiving apparatus may select the side having the maximum correlation coefficient among the four sides.

The visible light data receiving apparatus may compare the correlation coefficient of the selected side with a threshold value. By using the correlation coefficient calculated between each side and the reference region, the visible light data receiving apparatus may determine whether any side among four sides of a square region corresponds to the reference region.

Also, by determining whether any side among the four sides corresponds to the reference region, the visible light data receiving apparatus may determine whether the detected 2D color code is rotated. A method for determining the rotation angle of the detected 2D color code by the visible light data receiving apparatus will be described below in greater detail with reference to FIG. 10.

In operation S840, the visible light data receiving apparatus may determine whether the reference region is included in the detected object. When the reference region is not included in the detected object, the visible light data receiving apparatus may determine that an error has occurred.

In operation S845, when at least one object including the reference region is detected as the 2D color code, the visible light data receiving apparatus may select the 2D color code located nearest to the center of the image. However, operation S845 is not an essential operation. For example, in some exemplary embodiments, the visible light data receiving apparatus may perform an operation following operation S845 on each of the detected 2D color codes.

In operation S850, the visible light data receiving apparatus may correct the rotation angle of the detected 2D color code. For example, the visible light data receiving apparatus may acquire a non-rotated 2D color code by counter-rotating the 2D color code by the rotation angle determined in operation S835. As another example, the rotation angle of the detected 2D color code may be determined in operation S825.

The visible light data receiving apparatus may increase the accuracy of the demodulated visible light data by correcting the rotation angle when the detected 2D color code is rotated.

In operation S855, the visible light data receiving apparatus may demodulate the visible light data from the corrected 2D color code. The visible light data receiving apparatus may convert the chromaticity of each of the data cells included in the 2D color code into an x-coordinate and a y-coordinate on the chromaticity coordinates. The visible light data receiving apparatus may determine a signal point that is nearest to the coordinate of the data cell. The visible light data receiving apparatus may output a bit stream represented by the signal point as the visible light data.

Because a method for demodulating the visible light data is well-known in the art, detailed descriptions thereof will be omitted herein.

In operation S860, the visible light data receiving apparatus may correct an error of the visible light data.

FIGS. 10A to 10F are graphs illustrating examples of a correlation coefficient Ck calculated for each of reference candidate regions according to exemplary embodiments.

The graphs of FIGS. 10A to 10F illustrate the values of xi and Xi and the values of yi and Yi when i is assumed to correspond to a horizontal axis. Also, in each graph, thick lines represent xi and yi, and thin lines represent Xi and Yi.

FIG. 10A is a graph in the case where the reference candidate region of the object detected from the image corresponds to the reference region of the 2D color code. Referring to the graph of FIG. 10A, the correlation coefficient Ck between the top of the reference region and the reference candidate region is 0.941. Also, it may be seen from the graph of FIG. 10A that Xi increases/decreases as xi increases/decreases.

FIGS. 10B and 10C are graphs in the case where the object detected from the image does not correspond to the 2D color code. Referring to FIGS. 10B and 10C, it may be seen that the correlation coefficients Ck between the top of the reference region and the reference candidate region determined from the detected object have very low values of 0.058 and 0.078 respectively. Also, it may be seen from the graphs of FIGS. 10B and 10C that no correlation exists between xi and Xi and between yi and Yi.

Figure 10F:
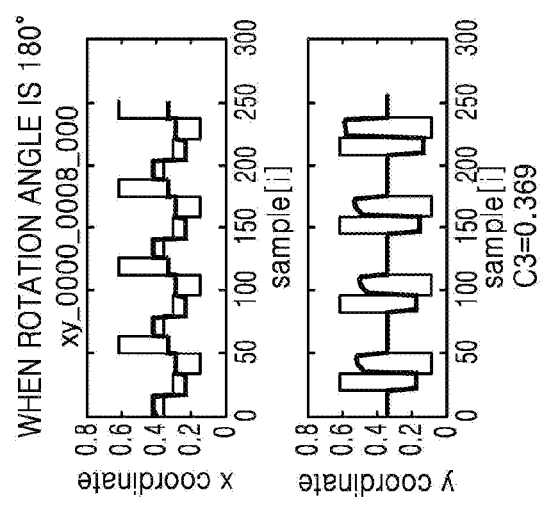
Figure 10E:
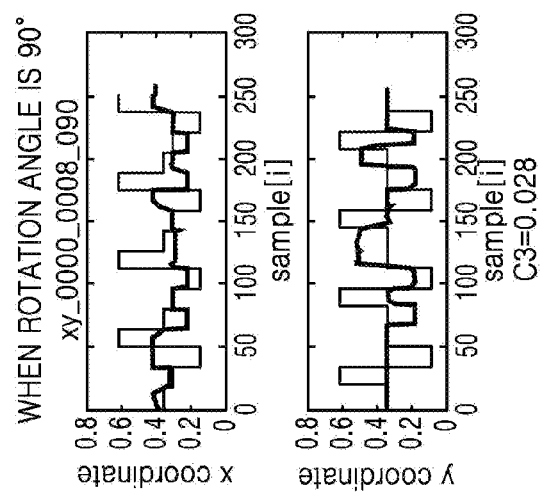
Figure 10D:
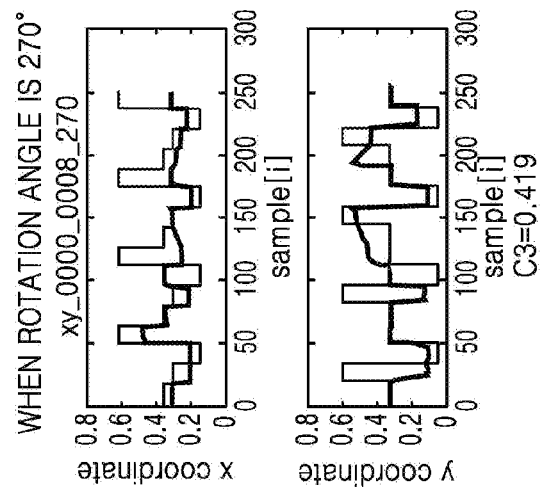

FIG. 10D is a graph in the case where the reference candidate region of the object detected from the image is rotated by 180° with respect to the reference region of the 2D color code. In FIG. 10D, the correlation coefficient Ck relating to the reference candidate region of the 2D color code is −0.369. Also, it may be seen from the graph of FIG. 10D that the chromaticity coordinate value of the cells constituting the reference candidate region and the chromaticity coordinate value of the cells constituting the reference region are deviated from each other by a difference of 180°.

Based on the correlation between the reference candidate region and the reference region of the 2D color code, the visible light data receiving apparatus may determine that the cells constituting the reference candidate region are arranged in the reverse order of the reference cells. Herein, when the reference region of the 2D color code to be compared is located at the top of the data region, the reference coordinate region of FIG. 10D may correspond to the reference region located at the bottom of the data region of the 2D color code.

FIG. 10E is a graph in the case where the reference candidate region of the object detected from the image is rotated by 90° with respect to the reference region of the 2D color code. In FIG. 10E, the correlation coefficient Ck relating to the reference candidate region of the 2D color code is 0.028. Also, it may be seen from the graph of FIG. 10E that the chromaticity coordinate value of the cells constituting the reference candidate region and the chromaticity coordinate value of the cells constituting the reference region are deviated from each other by a difference of 90°.

FIG. 10F is a graph in the case where the reference candidate region of the object detected from the image is rotated by 270° with respect to the reference region of the 2D color code. In FIG. 10F, the correlation coefficient Ck about the reference candidate region of the 2D color code is 0.419. Also, it may be seen from the graph of FIG. 10F that the chromaticity coordinate value of the cells constituting the reference candidate region and the chromaticity coordinate value of the cells constituting the reference region are deviated from each other by a difference of 270°.

As described above, the correlation coefficient may be very high when the object of a predetermined shape detected from the image corresponds to the 2D color code and the reference candidate region determined from the object corresponds to the reference region. On the other hand, the correlation coefficient may be very low when the object of a predetermined shape detected from the image does not correspond to the 2D color code. Thus, by preventing a region, which is less than or equal to a threshold value, from being determined as the 2D color code, the visible light data receiving apparatus may be prevented from misrecognizing an object which is not the 2D color code, as the 2D color code.

For example, in the case where a threshold value Cth is set as 0.5, when the correlation coefficient between the reference region and the reference candidate region of the detected object is smaller than or equal to 0.5, the visible light data receiving apparatus may determine that the detected object is not the 2D color code.

When the detected object is the rotated 2D color code, the correlation coefficient may have a negative value as in the case of FIG. 10D. Also, when the detected object is the rotated 2D color code, the correlation coefficient may have a relatively large value as in the case of FIG. 10F. The visible light data receiving apparatus may detect the 2D color code more accurately by calculating all the correlation coefficients corresponding to the four sides A, B, C, and D of a square and determining whether the side having the maximum correlation coefficient calculated exceeds a threshold value.

Also, by calculating all the correlation coefficients corresponding to four sides of a square object, the visible light data receiving apparatus may determine whether the reference region is located at any one of the four sides of the square object. The visible light data receiving apparatus may determine the rotation angle of the detected 2D color code by determining the position of the reference region. By correcting the detected 2D color code based on the determined rotation angle, the visible light data receiving apparatus may accurately demodulate the visible light data even when the 2D color code included in the image is rotated.

Figure 11:
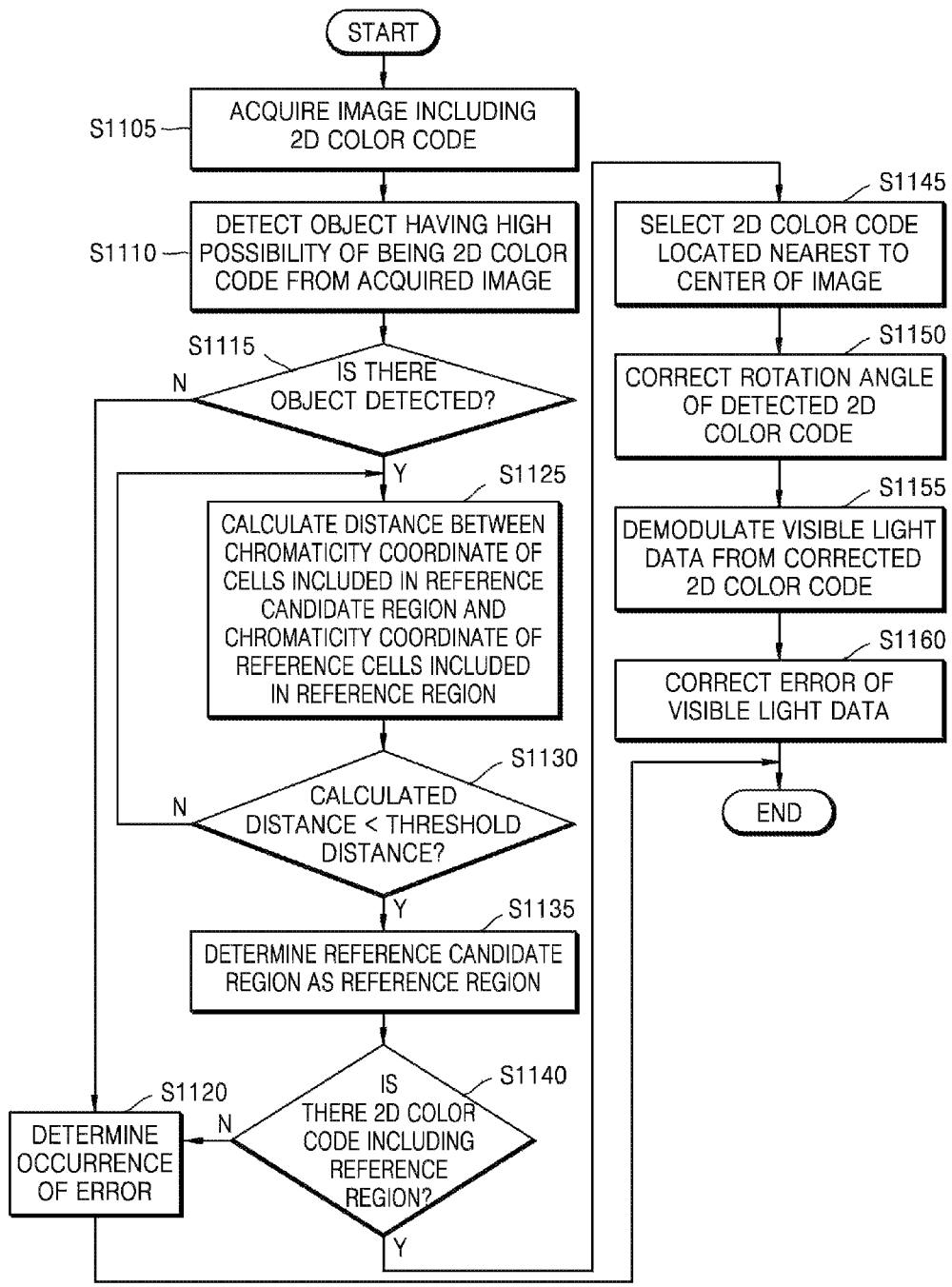
FIG. 11 is a flowchart illustrating a method of detecting a 2D color code by a visible light data receiving apparatus by using a distance between a chromaticity coordinate of cells included in a reference candidate region and a chromaticity coordinate of reference cells included in a reference region, according to an exemplary embodiment.

FIG. 11 is a flowchart illustrating a method for detecting a 2D color code by a visible light data receiving apparatus by using a distance between a chromaticity coordinate of cells included in a reference candidate region and a chromaticity coordinate of reference cells included in a reference region according to an exemplary embodiment.

Referring to FIG. 11, in operation S1105, the visible light data receiving apparatus may acquire an image including a 2D color code.

In operation S1110, the visible light data receiving apparatus may detect an object having a high possibility of being the 2D color code from the acquired image. For example, the visible light data receiving apparatus may detect an object corresponding to the shape of the 2D color code from the acquired image based on information about the shape of the prestored 2D color code.

In operation S1115, the visible light data receiving apparatus may determine whether there is an object detected from the acquired image.

In operation S1120, when there is no object detected, the visible light data receiving apparatus may determine that an error has occurred.

In operation S1125, the visible light data receiving apparatus may calculate a distance between the chromaticity coordinates of the reference cells included in the reference region and the chromaticity coordinates of the cells included in the reference candidate region estimated as the reference region from the detected object.

For example, the visible light data receiving apparatus may determine each of four sides of the detected square as the reference candidate region. The visible light data receiving apparatus may compare the chromaticity coordinates of the reference cells of the prestored reference region and the chromaticity coordinates included in the determined reference candidate region.

The visible light data receiving apparatus may determine a region, in which squares a0, a1, . . . , a255 having 1/256 of the length of a side A of a detected square object as the length of one side are arranged inside the side A, as a reference candidate region. Herein, the number of divisions of the side A is not limited to 256, and may be greater than the number of cells per side in a preset 2D color code.

The visible light data receiving apparatus may measure the chromaticity values of the squares a0, a1, . . . , a255 having 1/256 as the length of one side and output the measured chromaticity values as the x-coordinate value and the y-coordinate value on the chromaticity coordinates respectively. For example, the chromaticity coordinates about the chromaticity of a0, the chromaticity of a1, and the chromaticity of a255 may be output as (x0, y0), (x1, y1), and (x255, y255) respectively. Herein, the visible light data receiving apparatus may prestore the coordinates of the input chromaticity representing the chromaticity of the reference cells constituting the reference region.

Based on Equation 5 below, the visible light data receiving apparatus according to an exemplary embodiment may calculate an index representing the distance between the coordinates of the measured chromaticity and the coordinates of the input chromaticity. Herein, a sum Dk of the distances between the coordinates may be used as the index representing the distance between the coordinates.

However, a method for calculating the index representing the distance between the coordinates is not limited to Equation 5. As another example, the visible light data receiving apparatus may calculate an average value Dk/n of the distances between the coordinates as the index representing the distance between the coordinates.

$$D_k = \sum_{i=1}^{n} \sqrt{(x_i - X_i)^2 + (y_i - Y_i)^2} \quad \text{Equation 5}$$

In Equation 5, xi and yi denote the measured chromaticity representing the chromaticity of ai, and Xi and Yi denote the input chromaticity representing the chromaticity of the reference cell constituting the reference region.

In operation S1130, the visible light data receiving apparatus may determine whether the calculated index is smaller than a preset threshold distance.

When the detected object corresponds to the 2D color code and the reference candidate region corresponds to the reference region, a distance Dk between the coordinates of the measured chromaticity and the input chromaticity may be smaller than the threshold distance. On the other hand, when the detected object does not correspond to the 2D color code, the distance Dk between the coordinates of the measured chromaticity and the input chromaticity may be greater than or equal to the threshold distance.

The visible light data receiving apparatus according to an exemplary embodiment may detect the 2D color code more accurately by determining that the detected object does not correspond to the 2D color code when the distance Dk between the coordinates of the measured chromaticity and the input chromaticity is greater than or equal to the preset threshold distance. For example, when a threshold distance Dth is 0.5 and the distance Dk between the coordinates of the measured chromaticity and the input chromaticity is greater than or equal to the threshold distance Dth, the visible light data receiving apparatus may determine that the detected object does not correspond to the 2D color code.

In order to correspond to the case where the 2D color code is rotated, the visible light data receiving apparatus may calculate the distance between the coordinates of the reference region and the reference candidate region corresponding to each of four sides A, B, C, and D of a square. The visible light data receiving apparatus may estimate the threshold distance Dth with respect to the side having the minimum distance between the coordinates among the distances between the coordinates calculated for the four sides A, B, C, and D.

Because the distance Dk between the coordinates in the case where the candidate region corresponds to the reference region is smallest, the visible light data receiving apparatus may determine whether the reference region is located at any side of the region having a predetermined shape. The visible light data receiving apparatus may determine the rotation angle of the 2D color code by using the determined position of the reference region.

In operation S1135, when the calculated distance is smaller than the preset threshold distance, the visible light data receiving apparatus may determine the reference candidate region as the reference region.

In operation S1140, the visible light data receiving apparatus may determine whether there is a 2D color code including the reference region. When there is no 2D color code including the reference region, the visible light data receiving apparatus may determine that an error has occurred.

In operation S1145, the visible light data receiving apparatus may select the 2D color code located nearest to the center of the image among the detected 2D color codes. However, operation S1145 is not an essential operation. For example, in some exemplary embodiments the visible light data receiving apparatus may perform an operation following operation S1145 on each of all the detected 2D color codes.

In operation S1150, the visible light data receiving apparatus may correct the rotation angle of the detected 2D color code. For example, the visible light data receiving apparatus may acquire a non-rotated 2D color code by counter-rotating the 2D color code by the rotation angle determined in operation S1130.

The visible light data receiving apparatus may increase the accuracy of the demodulated visible light data by correcting the rotation angle when the detected 2D color code is rotated.

In operation S1155, the visible light data receiving apparatus may demodulate the visible light data from the 2D color code corrected in operation S1150. The visible light data receiving apparatus may convert the chromaticity of each of the data cells into the x-coordinate and the y-coordinate on the chromaticity coordinates. The visible light data receiving apparatus may determine a signal point that is nearest to the coordinate of the data cell. The visible light data receiving apparatus may output a bit stream represented by the signal point as the visible light data.

Because a method for demodulating the visible light data is well-known in the art, detailed descriptions thereof will be omitted herein.

In operation S1160, the visible light data receiving apparatus may correct an error of the visible light data.

The visible light data receiving apparatus may increase the accuracy of detecting the reference region by calculating the distance between the coordinates of the measured chromaticity representing the chromaticity of the reference candidate region and the input chromaticity representing the chromaticity of the reference region. Also, the visible light data receiving apparatus may increase the accuracy of demodulated visible light data by correcting the rotation angle of the detected 2D color code by using the distance between the coordinates of the measured chromaticity and the input chromaticity.

In some exemplary embodiments, the method of detecting the 2D color code by using the distance between the coordinates of the input chromaticity and the measured chromaticity may require a smaller amount of calculation than the method of detecting the 2D color code by using the correlation between the input chromaticity and the measured chromaticity. In some exemplary embodiments, the method of detecting the 2D color code by using the correlation between the input chromaticity and the measured chromaticity may have a higher accuracy than the method of detecting the 2D color code by using the distance between the coordinates of the input chromaticity and the measured chromaticity.

FIG. 12 is a table illustrating a parameter of a 2D color code according to an exemplary embodiment. The parameter of the 2D color code may include an SDM-CSK parameter. The SDM-CSK parameter may include the number of cells of the 2D color code and the number of signal points used to generate the data cell by the visible light data transmitting apparatus 410. Herein, the number of signal points may correspond to the number of reference colors.

For example, the SDM-CSK parameter may include three types of colors, for example 4color (4CSK), 8color (8CSK), and 16color (16CSK), and three types of cells, for example 8×8, 16×16, and 32×32. When there are three types of colors and three types of cells, there may be a combination of 9 colors and 9 cells.

Also, the 2D color code generated by the visible light data receiving apparatus according to an exemplary embodiment may have a structure of a matrix configuration including a predetermined number of cells, and a reference region may be disposed at a first row and a sixteenth row. Also, the number of reference points may be set to be equal to the number of signal points, and the number of reference cells may be set to be equal to the number of signal points. In the 2D color code according to an exemplary embodiment, a reference cell corresponding to each reference point may be arranged in predetermined order, and an arrangement of reference cells may be disposed repeatedly in the reference region. The number of times of repeating an arrangement of reference colors may be determined according to the number of cells of the 2D color code.

The table of FIG. 12 illustrates an example correspondence relationship between the number of reference colors, the number of cells, and the number of times an arrangement of reference cells is repeated. Herein, because a 16-color reference color arrangement may not be represented in the first row including 8 cells, a combination of 16 colors and 8×8 cells is not used.

Figure 13:
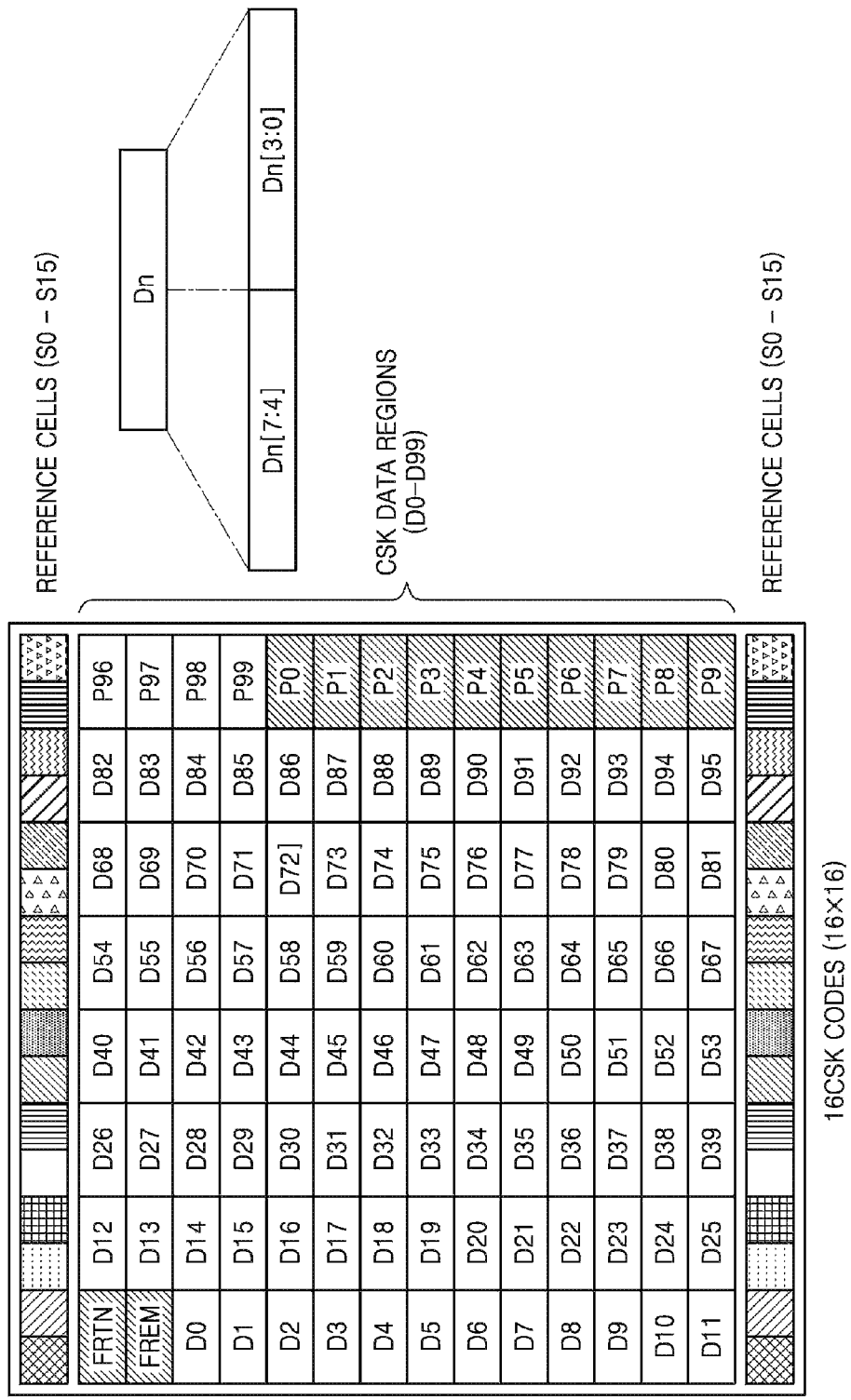
FIG. 13 is a diagram illustrating a 2D color code generated by a visible light data transmitting apparatus, according to an exemplary embodiment.
Figure 15A:
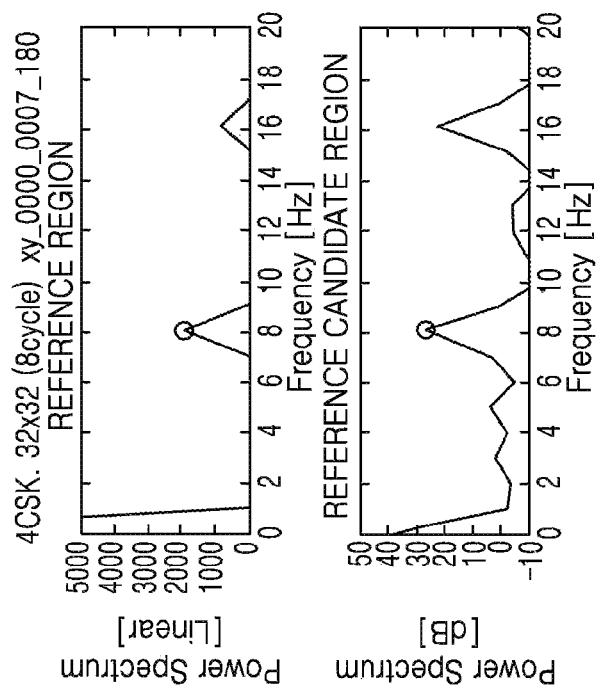
FIGS. 15A to 15D are graphs illustrating a result of frequency analysis performed on a reference candidate region corresponding to a reference region by a visible light data receiving apparatus, according to an exemplary embodiment.
Figure 15B:
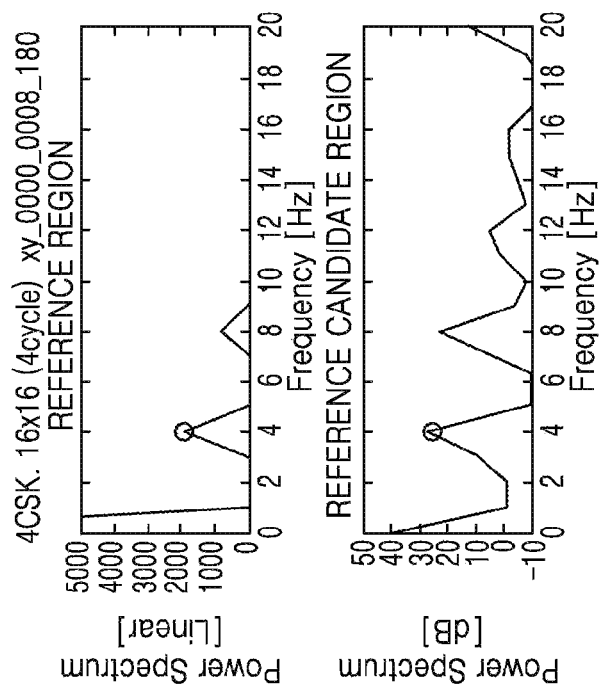
Figure 15C:
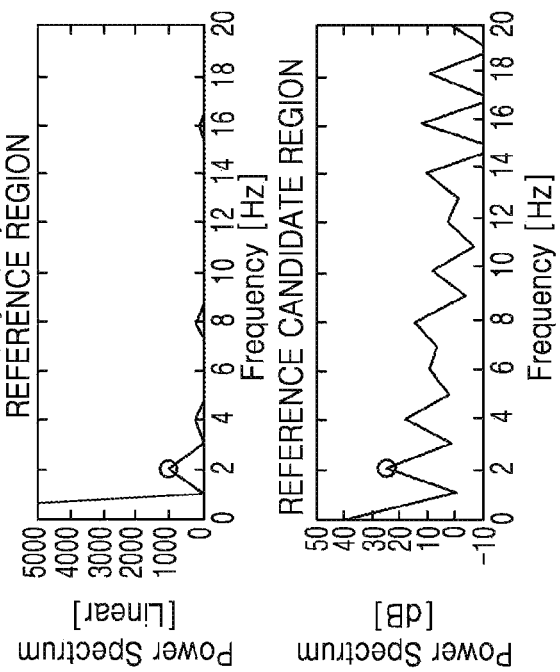
Figure 15D:
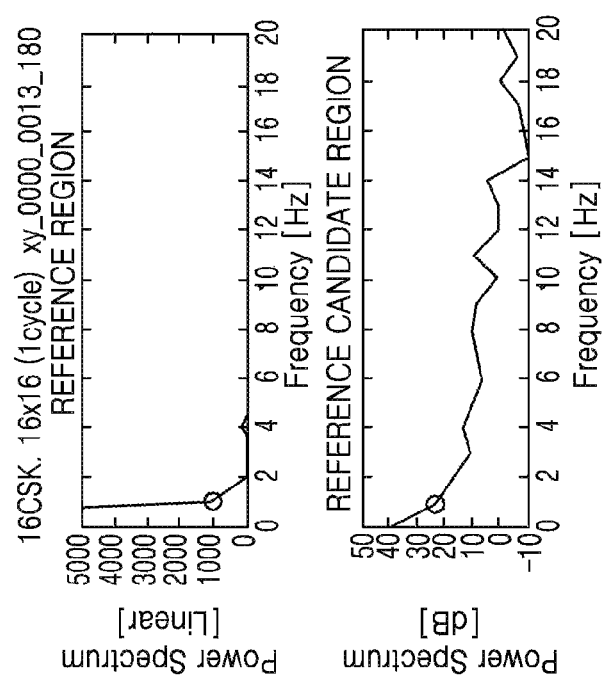

FIG. 13 is a diagram illustrating a 2D color code generated by a visible light data transmitting apparatus according to an exemplary embodiment.

Referring to FIG. 13, the 2D color code is 16×16SDM-16CSK in which reference cells S0 to S15 corresponding to 16 reference points set on the chromaticity coordinates are arranged in the first row and the sixteenth row. Herein, it is assumed that the number of reference points, the number of signal points, and the chromaticity thereof are identical.

The number of cells and the number of colors constituting the 2D color code may influence the number of times of repeating an arrangement of reference cells in the reference region. Thus, by determining the arrangement or chromaticity of reference cells, the visible light data receiving apparatus may determine the parameters including the number of cells and the number of colors used in the visible light data transmitting apparatus.

FIG. 14 is a flowchart illustrating a method for determining a parameter by analyzing a detected 2D color code by a visible light data receiving apparatus according to an exemplary embodiment.

Referring to FIG. 14, in operation S1405, the visible light data receiving apparatus may acquire an image including a 2D color code. The visible light data receiving apparatus may acquire an image by capturing an image including the 2D color code displayed on the visible light data transmitting apparatus 410.

In operation S1410, the visible light data receiving apparatus may detect a region having a high possibility of including the 2D color code from the acquired image. The visible light data receiving apparatus according to an exemplary embodiment may detect an object corresponding to the shape of the 2D color code from the acquired image based on information about the shape of the prestored 2D color code. In some exemplary embodiments, when the region having a predetermined shape is not detected, the visible light data receiving apparatus may end a series of processes for demodulating data.

In operation S1415, the visible light data receiving apparatus may perform a frequency analysis (FFT) on the detected object. By the frequency analysis, the visible light data receiving apparatus may determine the parameter of the 2D color code included in the detected object.

By the frequency analysis, the visible light data receiving apparatus according to an exemplary embodiment may determine the number of times that the same color arrangement is repeated in the reference candidate region. Referring to FIG. 12, it may be seen that an arrangement of 16-color reference cells is disposed in the reference regions S0 to S15 of the 2D color code according to an exemplary embodiment. In the case of the 2D color code illustrated in FIG. 12, the number of times of repeating an arrangement of reference cells may be detected as 1 by the frequency analysis.

Hereinafter, the result of performing a frequency analysis on the object detected from the image will be described with reference to FIG. 15.

FIGS. 15A to 15D are graphs illustrating the result of a frequency analysis (FFT) performed on a reference candidate region corresponding to a reference region by a visible light data receiving apparatus according to an exemplary embodiment.

Among the graphs shown in FIGS. 15A to 15D, the top graph in each figure illustrates a power spectrum of the reference region of the 2D color code generated by the visible light data transmitting apparatus. Also, among the graphs shown in FIGS. 15A to 15D, the bottom graph in each figure illustrates a power spectrum of the reference candidate region of the 2D color code detected by the visible light data receiving apparatus.

It may be seen from FIGS. 15A to 15D that the intensity of a frequency component identical to a repetition frequency is maximized. However, herein, the value of a direct current component corresponding to the case of a frequency being 0 will be excluded. The visible light data receiving apparatus may measure a peak value of the frequency spectrum represented by the color of each of cells included in the determined reference candidate region. Also, the visible light data receiving apparatus may determine a pattern of the cells based on the measured peak value.

For example, by frequency analysis, the visible light data receiving apparatus may determine the number of times of repeating an arrangement of cells corresponding to the number of reference points included in the reference candidate region. Based on the determined number of times of the repetition, the visible light data receiving apparatus may determine at least one parameter including a combination of the number of signal colors and the number of cells that may be included in the 2D color code.

In operation S1420, the visible light data receiving apparatus may determine whether a plurality of parameters are determined. When one parameter is determined, the visible light data receiving apparatus may perform operations S1440 to S1450 for demodulating the visible light data from the 2D color code determined based on the determined parameter. Operations S1440 to S1450 will be described below.

In operation S1425, when a plurality of parameters are determined, the visible light data receiving apparatus may calculate a correlation coefficient between property information about the reference region and the reference candidate regions determined based on the respective parameters.

In operation S1430, the visible light data receiving apparatus may determine whether the calculated correlation coefficient is greater than a threshold value. By determining whether the calculated correlation coefficient is greater than a preset threshold value, the visible light data receiving apparatus may determine whether the reference candidate region corresponds to the reference region.

In operation S1435, the visible light data receiving apparatus may determine the parameter of the reference candidate region having the maximum correlation coefficient value among the 2D color codes determined based on the respective parameters. The visible light data receiving apparatus may detect the 2D color code corresponding to the determined parameter.

In operation S1440, the visible light data receiving apparatus may correct the rotation angle of the detected 2D color code.

In operation S1445, the visible light data receiving apparatus may demodulate the visible light data from the corrected 2D color code.

In operation S1450, the visible light data receiving apparatus may correct an error of the visible light data.

In some exemplary embodiments, the operation of comparing the reference candidate region and the reference region in operations S1425 to S1435 may be performed based on the method of calculating the distance between the chromaticity coordinates of the cells included in the reference candidate region and the chromaticity coordinates of the reference cells included in the reference region, which has been described above with reference to FIG. 11.

When the parameter used in the visible light communication based on SDM-CSK is set or changed by the visible light data transmitting apparatus, the visible light data receiving apparatus may acquire information of the set or changed parameter by analyzing the frequency spectrum of the reference candidate region.

As another example, the visible light data receiving apparatus may determine the 2D color code more efficiently by performing a frequency analysis on the reference candidate region. When the frequency analysis is not performed, in order to determine the parameter, the visible light data receiving apparatus should determine whether each of the reference candidate regions determined by a possible combination of parameters corresponds to the reference region based on the method described above with reference to FIG. 8 or 11. However, by selecting a possible parameter among the parameters by the frequency analysis, the visible light data receiving apparatus may reduce an amount of calculation that is necessary to determine whether the reference candidate region corresponds to the reference region.

The inventive concept is not limited to the above exemplary embodiments and may be modified without departing from the spirit and scope of the inventive concept. For example, the above exemplary embodiments mainly illustrate the case where the reference point and the signal point are identical. When the reference point and the signal point are not identical, the number of colors included in the 2D color code may be reduced. However, the reference point and the signal point may not be necessarily identical. The reference point may be freely set on the chromaticity coordinates regardless of the signal point.

For example, the visible light data transmitting apparatus may generate a reference region including an arrangement of reference cells having a reference color with a small detection error. The visible light data transmitting apparatus may generate a reference region by using a reference color having a small correlation with another object in the image or the data cell. Also, the visible light data transmitting apparatus may generate a reference region by using a reference color having a spectrum with many feature points. In the case of the reference region including the reference color having a spectrum with many feature points, the visible light data receiving apparatus may determine one parameter just by performing a frequency spectrum analysis.

Also, in the above exemplary embodiments, the reference region includes a one-dimensional reference color arrangement that is adjacent to the data region as illustrated in FIG. 5. However, in some exemplary embodiments, the reference region may be disposed at a predetermined position with respect to the data region, and may not be necessarily adjacent to the data region. The reference region may be disposed at an estimatable random position on the 2D color code.

Figure 16:
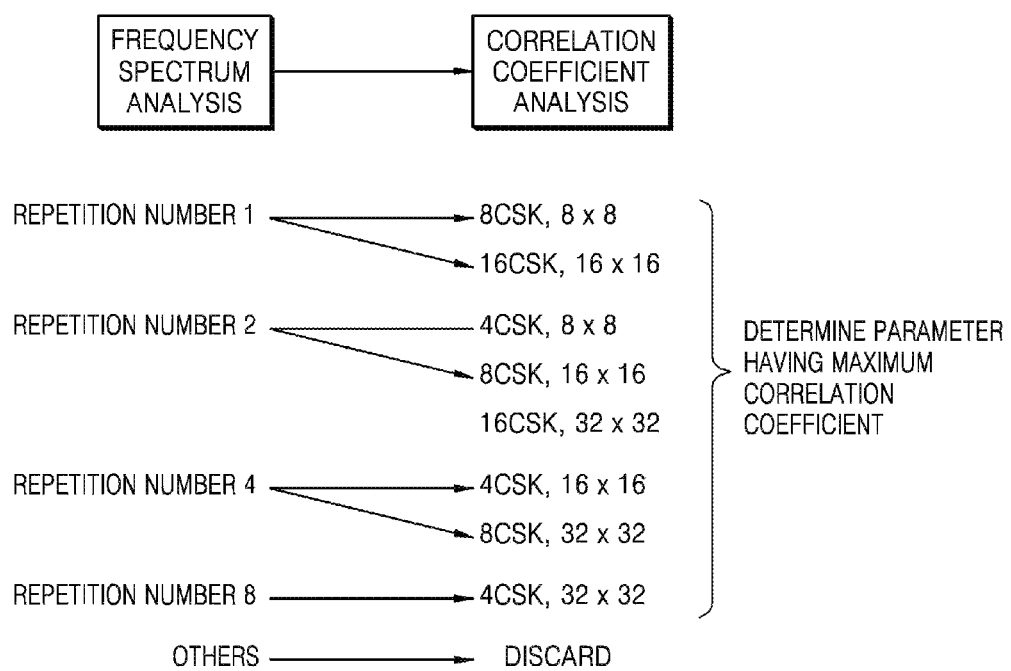
FIG. 16 is a diagram illustrating a result of frequency analysis performed by a visible light data receiving apparatus, according to an exemplary embodiment.

FIG. 16 is a diagram illustrating the result of a frequency analysis performed by a visible light data receiving apparatus according to an exemplary embodiment.

The visible light data receiving apparatus according to an exemplary embodiment may reduce the number of necessary parameters by performing a frequency spectrum analysis before calculating a distance between the coordinates or a correlation function about parameters. The visible light data receiving apparatus may reduce the calculation amount by the frequency spectrum analysis.

Referring to FIG. 16, the visible light data receiving apparatus may acquire 1, 2, 4, and 8 as repetition numbers. Also, when another number different from the repetition number is acquired, the visible light data receiving apparatus may determine the occurrence of an error value and remove the corresponding result.

The visible light data receiving apparatus according to an exemplary embodiment may determine a parameter corresponding to the determined repetition number. Also, the visible light data receiving apparatus may determine a parameter having the maximum correlation coefficient by comparing property information about the reference region and the determined parameter.

In the exemplary embodiment described with reference to FIG. 16, it is assumed that the reference candidate region to be frequency-analyzed is identical to the reference region. For example, it is difficult to acquire a suitable repetition number when the object including the reference candidate region is different from the shape of the 2D color code or when the 2D color code is rotated. In this case, the visible light data receiving apparatus may determine the distance or calculate the correlation coefficient repeatedly by the number of parameters that are necessary to select the reference region.

When the reference candidate region and the reference region are not identical, because a frequency analysis according to an exemplary embodiment may greatly reduce the necessary amount of calculation, the frequency analysis may be performed as a preprocess before the operation of determining the distance or calculating the correlation coefficient.

Figure 17:
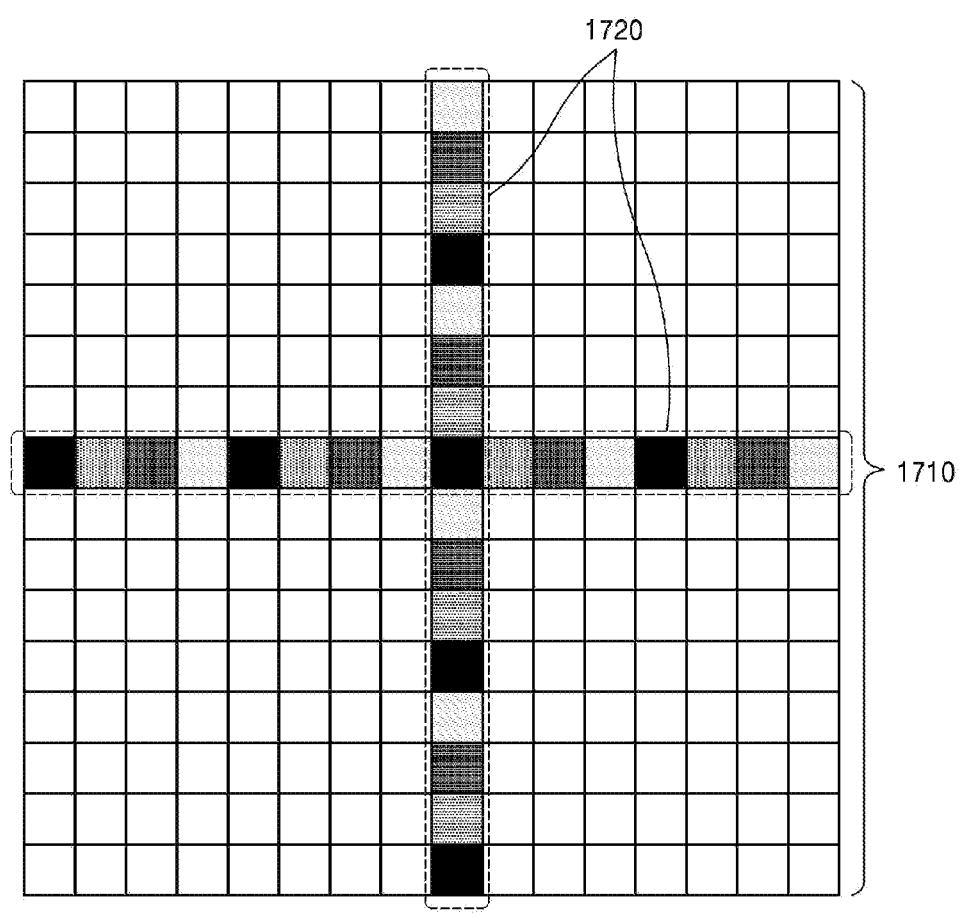
FIGS. 17 to 19 are diagrams illustrating a reference region disposed at a random position on a 2D color code.
Figure 18:
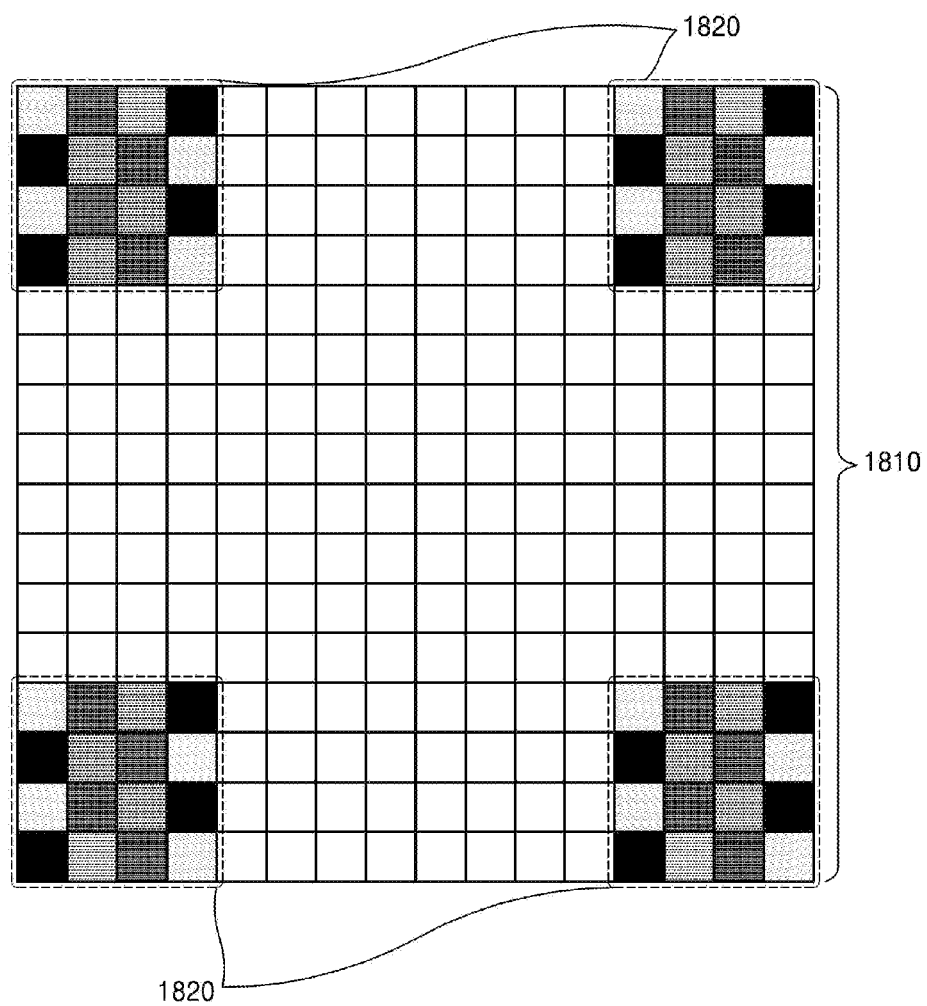
Figure 19:
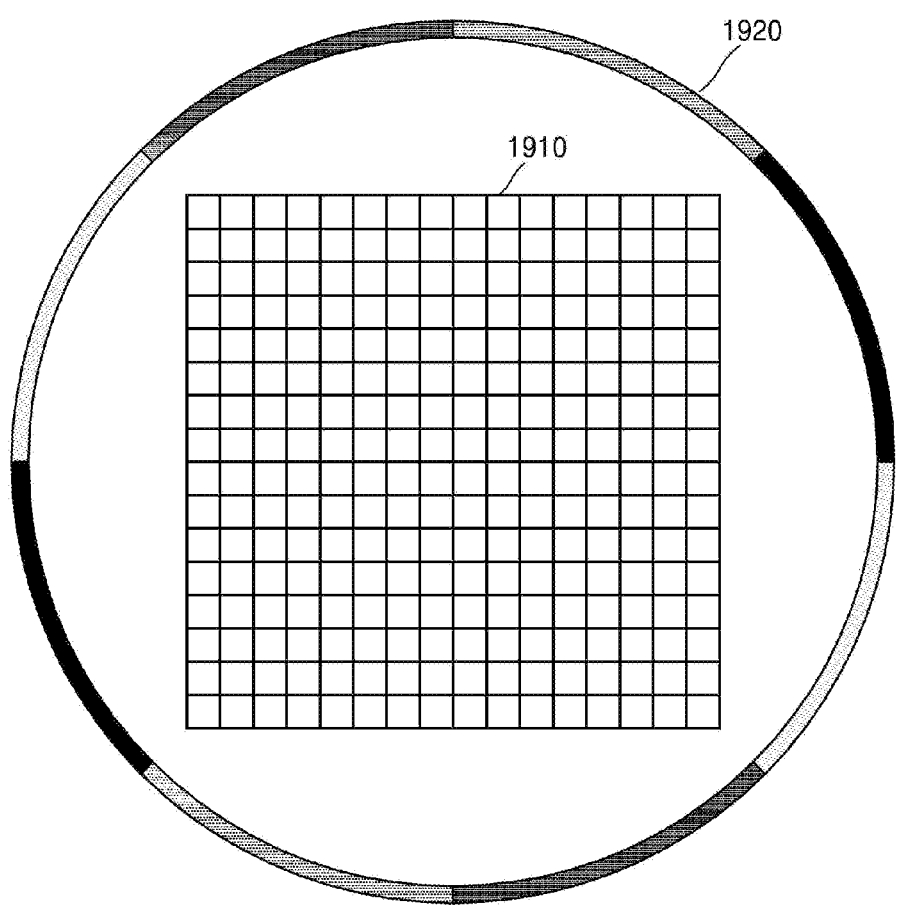

FIGS. 17 to 19 are diagrams illustrating a reference region disposed at other exemplary positions on a 2D color code. In the 2D color code illustrated in FIG. 17, a reference region 1720 is disposed inside a data region 1710. In the 2D color code illustrated in FIG. 18, a reference region 1820 having a 2D arrangement is disposed at a preset position within a data region 1810. Also, in the 2D color code illustrated in FIG. 19, a reference region 1920 may be disposed in the shape of a lattice at a position spaced apart from a data region 1910 by a predetermined distance.

In the above exemplary embodiments, the color codes having a 2D square shape are generally illustrated. However, the 2D color code may have any one of the shapes that may be detected in the 2D color code by the visible light data receiving apparatus.

Also, although example hardware configurations of the exemplary embodiments have been described, the inventive concept is not limited thereto and may also be implemented by executing a computer program for processing in a central processing unit (CPU). In this case, the computer program may be stored and provided to a computer by using various types of non-transitory computer-readable mediums. The non-transitory computer-readable mediums may include various types of tangible storage mediums. Examples of the non-transitory computer-readable mediums may include magnetic recording mediums (e.g., flexible disks, magnetic tapes, and hard disk drives), magneto-optical recording mediums (e.g., magneto-optical disks), compact disk read-only memories (CD-ROMs), CD-Rs, CD-RWs, and semiconductor memories (e.g., mask ROMs, programmable ROMs (PROMs), Erasable PROMs (EPROMs), flash ROMs, and random-access memories (RAMs)). Also, the program may be provided to the computer by various types of transitory computer-readable mediums. Examples of the transitory computer-readable mediums may include electrical signals, optical signals, and electromagnetic waves. The transitory computer-readable mediums may provide the program to the computer through wireless communication channels or wired communication channels such as electrical lines and optical fibers.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An apparatus for receiving visible light data, the apparatus comprising:
   an image acquirer configured to acquire an image including a color code, the color code including a data region and a reference region;
   a detector configured to detect in the acquired image an object having a shape corresponding to the color code, determine a reference candidate region in the object, and determine the object to be the color code by comparing property information of the reference region with the determined reference candidate region; and
   a demodulator configured to demodulate visible light data from the data region,
   wherein the property information of the reference region includes a chromaticity coordinate of reference cells included in the reference region.

2. The apparatus of claim 1, wherein the detector is further configured to determine the object to be the color code when a correlation coefficient between chromaticity coordinates of reference candidate cells included in the determined reference candidate region and chromaticity coordinates of the reference cells included in the property information is greater than a threshold value.

3. The apparatus of claim 2, wherein the detector is further configured to predict a rotation angle of the color code by using the correlation coefficient between the chromaticity coordinates of the reference candidate cells and the chromaticity coordinates of the reference cells, and to correct the color code according to the predicted rotation angle.

4. The apparatus of claim 1, wherein the detector is further configured to determine the object to be the color code when a distance between chromaticity coordinates of reference candidate cells included in the determined reference candidate region and chromaticity coordinates of the reference cells included in the property information is smaller than a threshold distance.

5. The apparatus of claim 4, wherein the detector is further configured to predict a rotation angle of the color code by using the distance between the chromaticity coordinates of the reference candidate cells and the chromaticity coordinates of the reference cells, and to correct the color code according to the predicted rotation angle.

6. The apparatus of claim 1, wherein the detector is further configured to determine the object to be the color code by comparing a frequency spectrum corresponding to a chromaticity of reference candidate cells included in the determined reference candidate region and the frequency spectrum corresponding to the chromaticity of the reference cells included in the property information.

7. The apparatus of claim 1, wherein the detector is further configured to measure a peak value of a frequency spectrum represented by a color of reference candidate cells included in the determined reference candidate region and to determine a pattern of the reference candidate cells based on the measured peak value.

8. The apparatus of claim 7, wherein the pattern of the reference candidate cells includes at least one parameter relating to at least one of a number of signal points representing the visible light data, a number of cells included in the data region, and a pattern of a reference point repeated in the reference region.

9. An apparatus for transmitting visible light data, the apparatus comprising:
   an acquirer configured to acquire a data region including data cells and to generate a color code by arranging a reference region including reference cells at a preset position with respect to the data region; and
   a display configured to display an image including the generated color code,
   wherein at least one object having a shape corresponding to the color code is identified by property information of the reference region, and
   wherein the property information of the reference region includes a chromaticity coordinate of the reference cells included in the reference region.

10. The apparatus of claim 9, wherein the property information of the reference region includes a frequency spectrum corresponding to a chromaticity of the reference cells.

11. A method for receiving visible light data, the method comprising:
   acquiring an image including a color code, the color code including a data region and a reference region;
   detecting in the acquired image an object having a shape corresponding to the color code;
   determining a reference candidate region in the object;
   determining the object to be the color code by comparing property information of the reference region with the determined reference candidate region; and
   demodulating visible light data from the data region,
   wherein the property information of the reference region includes a chromaticity coordinate of reference cells included in the reference region.

12. The method of claim 11, wherein the determining the object to be the color code further comprises determining the object to be the color code when a correlation coefficient between chromaticity coordinates of reference candidate cells included in the determined reference candidate region and chromaticity coordinates of the reference cells included in the property information is greater than a threshold value.

13. The method of claim 12, further comprising:
   predicting a rotation angle of the color code by using the correlation coefficient between the chromaticity coordinates of the reference candidate cells and the chromaticity coordinates of the reference cells; and
   correcting the color code according to the predicted rotation angle.

14. The method of claim 11, wherein the determining the object to be the color code further comprises determining the object to be the color code when a distance between chromaticity coordinates of reference candidate cells included in the determined reference candidate region and chromaticity coordinates of the reference cells included in the property information is smaller than a threshold distance.

15. The method of claim 14, further comprising:
   predicting a rotation angle of the color code by using the distance between the chromaticity coordinates of the reference candidate cells and the chromaticity coordinates of the reference cells; and correcting the color code according to the predicted rotation angle.

16. The method of claim 11, wherein the determining the object to be the color code further comprises determining the object to be the color code by comparing a frequency spectrum corresponding to a chromaticity of reference candidate cells included in the determined reference candidate region and the frequency spectrum corresponding to the chromaticity of the reference cells included in the property information.

17. The method of claim 11, wherein the determining the object to be the color code further comprises measuring a peak value of a frequency spectrum represented by a color of reference candidate cells included in the determined reference candidate region and determining a pattern of the reference candidate cells based on the measured peak value.

18. The method of claim 17, wherein the pattern of the reference candidate cells includes at least one parameter relating to at least one of a number of signal points representing the visible light data, a number of cells included in the data region, and a pattern of a reference point repeated in the reference region.

19. A non-transitory computer-readable recording medium that stores a program which, when executed by a processor, causes the processor to perform the method of claim 11.

20. A method for transmitting visible light data, the method comprising:
    acquiring a data region including data cells;
    generating a color code by arranging a reference region including reference cells at a preset position with respect to the data region; and
    displaying an image including the generated color code,
    wherein at least one object having a shape corresponding to the color code is identified by property information of the reference region,
    wherein the property information of the reference region includes a chromaticity coordinate of the reference cells included in the reference region.

21. The method of claim 20, wherein the property information of the reference region includes a frequency spectrum about a chromaticity of each of the reference cells.

* * * * *